US010982672B2

(12) United States Patent
Scancarello et al.

(10) Patent No.: US 10,982,672 B2
(45) Date of Patent: *Apr. 20, 2021

(54) HIGH-STRENGTH LIGHT-WEIGHT LATTICE-CORED ADDITIVE MANUFACTURED COMPRESSOR COMPONENTS

(71) Applicant: Emerson Climate Technologies, Inc., Sidney, OH (US)

(72) Inventors: Marc J. Scancarello, Troy, OH (US); Robert C. Stover, Versailles, OH (US)

(73) Assignee: Emerson Climate Technologies, Inc., Sidney, OH (US)

( * ) Notice: Subject to any disclaimer, the term of this patent is extended or adjusted under 35 U.S.C. 154(b) by 335 days.

This patent is subject to a terminal disclaimer.

(21) Appl. No.: 15/366,871

(22) Filed: Dec. 1, 2016

(65) Prior Publication Data
US 2017/0182561 A1    Jun. 29, 2017

Related U.S. Application Data

(60) Provisional application No. 62/387,119, filed on Dec. 23, 2015.

(51) Int. Cl.
*F04C 18/02*    (2006.01)
*B33Y 10/00*    (2015.01)
(Continued)

(52) U.S. Cl.
CPC ........ *F04C 18/0215* (2013.01); *B22F 3/1055* (2013.01); *B22F 5/10* (2013.01);
(Continued)

(58) Field of Classification Search
CPC .............. F04C 18/0215; F04C 18/0246; F04C 2230/20; F04C 29/04; F04C 29/063; B23P 15/00; B33Y 10/00; B33Y 70/00
See application file for complete search history.

(56) References Cited

U.S. PATENT DOCUMENTS 2,940,557 A * 6/1960 Herbert, Jr. ............. E04C 2/365
428/593
4,097,195 A    6/1978 Hill
(Continued)

FOREIGN PATENT DOCUMENTS

CN    1118041 A    3/1996
CN    1315586 A    10/2001
(Continued)

OTHER PUBLICATIONS

International Search Report regarding International Application No. PCT/US2016/065166, dated Mar. 22, 2017.
(Continued)

*Primary Examiner* — Mary Davis
(74) *Attorney, Agent, or Firm* — Harness, Dickey & Pierce, P.L.C.

(57) ABSTRACT

A light-weight, high-strength compressor component is formed via additive manufacturing that has controlled stiffness and/or deflection levels. The component may have at least one interior region comprising a lattice structure that comprises a plurality of repeating cells. A solid surface is disposed over the lattice structure. The interior region comprises the lattice structure in the body portion of the light-weight, high-strength compressor component. The lattice structure may be used to globally or locally control stiffness and/or deflection levels of the compressor component. Additive manufacturing provides flexibility in forming compressor components with desirably improved strength-to-weight ratios while exhibiting high levels of control over stiffness and/or deflection. Methods of making such compressor components via additive manufacturing processes are also provided.

19 Claims, 17 Drawing Sheets

(51) Int. Cl.
*B33Y 80/00* (2015.01)
*B22F 5/10* (2006.01)
*B22F 3/105* (2006.01)

(52) U.S. Cl.
CPC .............. *B33Y 10/00* (2014.12); *B33Y 80/00* (2014.12); *F04C 2230/103* (2013.01); *F04C 2230/22* (2013.01)

(56) References Cited

U.S. PATENT DOCUMENTS

| | | | |
|---|---|---|---|
| 5,320,506 | A | 6/1994 | Fogt |
| 5,556,270 | A | 9/1996 | Komine et al. |
| 5,594,216 | A | 1/1997 | Yasukawa et al. |
| 5,716,202 | A | 2/1998 | Koyama et al. |
| 5,842,842 | A | 12/1998 | Callens et al. |
| 6,841,011 | B2 | 1/2005 | Lin |
| 6,918,970 | B2 | 7/2005 | Lee et al. |
| 7,540,710 | B2 | 6/2009 | Grote et al. |
| 7,601,148 | B2 | 10/2009 | Keller |
| 7,623,940 | B2 | 11/2009 | Huskamp et al. |
| 8,104,799 | B2 | 1/2012 | Huskamp et al. |
| 8,650,756 | B2 | 2/2014 | Wadley et al. |
| 8,826,938 | B2 | 9/2014 | Moore |
| 9,605,677 | B2 | 3/2017 | Heidecker et al. |
| 10,036,258 | B2 | 7/2018 | Mongillo et al. |
| 10,281,053 | B2 | 5/2019 | Griffin, Jr. et al. |
| 10,557,464 | B2 | 2/2020 | Scancarello et al. |
| 10,634,143 | B2 * | 4/2020 | Scancarello ........ F04C 18/0246 |
| 2008/0138648 | A1 | 6/2008 | Halberstadt et al. |
| 2010/0202910 | A1 | 8/2010 | Yamamoto et al. |
| 2011/0268580 | A1 | 11/2011 | Bryk et al. |
| 2012/0117822 | A1 | 5/2012 | Jarvis |
| 2012/0213659 | A1 | 8/2012 | Bayer et al. |
| 2013/0011269 | A1 | 1/2013 | Gainnozzi et al. |
| 2013/0064661 | A1 | 3/2013 | Evans et al. |
| 2013/0233526 | A1 | 9/2013 | Hislop |
| 2013/0280049 | A1 | 10/2013 | Fisk et al. |
| 2014/0010679 | A1 | 1/2014 | Rice et al. |
| 2014/0182292 | A1 | 7/2014 | Hudon et al. |
| 2014/0202163 | A1 | 7/2014 | Johnson et al. |
| 2015/0035392 | A1 | 2/2015 | Pal |
| 2015/0052898 | A1 | 2/2015 | Erno et al. |
| 2015/0064015 | A1 | 3/2015 | Perez |
| 2015/0080495 | A1 | 3/2015 | Heikkila |
| 2015/0275916 | A1 * | 10/2015 | Marshall ............... F01D 17/162 415/148 |
| 2015/0276287 | A1 | 10/2015 | Cosby, II et al. |
| 2015/0345304 | A1 | 12/2015 | Mongillo et al. |
| 2015/0345396 | A1 | 12/2015 | Zelesky et al. |
| 2016/0082628 | A1 | 3/2016 | Yang |
| 2016/0151829 | A1 | 6/2016 | Propheter-Hinckley et al. |
| 2016/0208372 | A1 * | 7/2016 | Wadley ..................... C23C 8/22 |
| 2016/0279885 | A1 | 9/2016 | Cantwell et al. |
| 2016/0341249 | A1 | 11/2016 | Yang et al. |
| 2017/0184086 | A1 | 6/2017 | Scancarello et al. |
| 2017/0184108 | A1 | 6/2017 | Scancarello et al. |
| 2017/0234143 | A1 | 8/2017 | Snyder |
| 2018/0038385 | A1 | 2/2018 | Welch |
| 2020/0141399 | A1 | 5/2020 | Scancarello et al. |

FOREIGN PATENT DOCUMENTS

| | | |
|---|---|---|
| CN | 1612760 A | 5/2005 |
| CN | 1643171 A | 7/2005 |
| CN | 1807090 A | 7/2006 |
| CN | 103967837 A | 8/2014 |
| CN | 104662199 A | 5/2015 |
| EP | 2762252 A1 | 8/2014 |
| WO | 2012066311 A2 | 5/2012 |
| WO | WO-2013142502 A1 | 9/2013 |
| WO | WO-2014155039 A1 | 10/2014 |
| WO | WO-2014158600 A1 | 10/2014 |
| WO | 2015009448 A1 | 1/2015 |
| WO | WO-2017112405 A2 | 6/2017 |
| WO | WO-2017112406 A1 | 6/2017 |
| WO | WO-2017112407 A1 | 6/2017 |

OTHER PUBLICATIONS

Written Opinion of the International Searching Authority regarding International Application No. PCT/US2016/065166, dated Mar. 22, 2017.

First Office Action for Chinese Patent Application No. 201680081159.8 dated Mar. 8, 2019 with English language translation provided by Unitalen Attorneys at Law, 19 pages.

First Office Action for Chinese Patent Application No. 201680081457.7 dated Mar. 15, 2019 with English language translation provided by Unitalen Attorneys at Law, 20 pages.

First Office Action for Chinese Patent Application No. 201680081473.6 dated Mar. 15, 2019 with English language translation provided by Unitalen Attorneys at Law, 19 pages.

Feih, Stefanie et al. "Advanced 3D metallic lattice structures for composite sandwich materials," [online] [retrieved on Sep. 8, 2018] Retrieved from the Internet: <URL: http://www.a-star.edu.sg/Portals/0/uploads/AGA/2015-ags/cambridge/Advanced%203D%20metallic%20lattice%20structures%20for%20composite%20sandwich%20materials.pdf>.

Mun, Jiwon et al. "Indirect Additive Manufacturing of a Cubic Lattice Structure with a Copper Alloy," *Proceedings of the Twenty-Fifth annual International Solid Freeform Fabrication (SFF) Symposium—An Additive Manufacturing Conference*, Austin, Texas, Aug. 4-6, 2014. [online] [retrieved on May 12, 2015]. Retrieved from the Internet: <URL: sffsymposium.engr.utexas.edu/sites/default/files/2014-055-Mun.pdf>, pp. 665-687.

Rosen, David et al. "Design of General Lattice Structures for Lightweight and Compliance Applications," *Proceedings of the Rapid Manufacturing Conference*, Loughborough, UK, Jul. 5-6, 2006. [online] [retrieved on May 12, 2015]. Retrieved from the Internet: <URL: http://hdl.handle.net/1853/33037>.

International Search Report regarding International Application No. PCT/US2016/065167, dated Mar. 20, 2017.

Written Opinion of the International Searching Authority regarding International Application No. PCT/US2016/065167, dated Mar. 20, 2017.

International Preliminary Report on Patentability regarding International Patent Application No. PCT/US2016/065167 dated Jun. 26, 2018.

International Search Report regarding International Application No. PCT/US2016/065164, dated Mar. 21, 2017.

Written Opinion of the International Searching Authority regarding International Application No. PCT/US2016/065164, dated Mar. 21, 2017.

International Preliminary Report on Patentability regarding International Patent Application No. PCT/US2016/065164 dated Jun. 26, 2018.

International Preliminary Report on Patentability regarding International Patent Application No. PCT/US2016/065166 dated Jun. 26, 2018.

Extended European Search Report for European Patent Application No. 16879861.9 dated Jun. 21, 2019, 7 pages.

"Polyetherimide (PEI): A Comprehensive Review" Special Chem, <URL: https://omnexus.specialchem.com/selection-guide/polyetherimide-pei-high-heat-plastic#>] [retrieved online: Jun. 26, 2019].

Extended European Search Report for European Patent Application No. 16879863.5 dated Oct. 23, 2019, 8 pages.

Second Office Action for Chinese Patent Application No. 201680081159.8 dated Nov. 4, 2019 with English language translation provided by Unitalen Attorneys at Law, 23 pages.

Second Office Action for Chinese Patent Application No. 201680081457.7 dated Nov. 18, 2019 with English language translation provided by Unitalen Attorneys at Law, 26 pages.

Second Office Action for Chinese Patent Application No. 201680081473.6 dated Nov. 18, 2019 with English language translation provided by Unitalen Attorneys at Law, 21 pages.

(56) References Cited

OTHER PUBLICATIONS

Scancarello, Marc J. et al., U.S. Appl. No. 16/719,161, filed Dec. 18, 2019 entitled, "Latice-Cored Additive Manufactured Compressor Components With Fluid Delivery Features," 50 pages.
Dielectric Manufacturing, Ultem® (Polyetherimide, PEI), [online], [retrieved on Jun. 12, 2020]. Retrieved from the Internet: <URL:https://dielectricmfg.com/knowledge-base/ultem/>, 4 pages.
ULTEM® (polyetherimide). Datasheet. Ensinger [online], [retrieved on Jun. 16, 2020]. Retrieved from the Internet: <URL:<http://www.sdplastics.com/ensinger/tecapei.html>, 2 pages.
CROW©, Unfilled Polyetherimide (PEI) 2015, [online], [retrieved on Jun. 12, 2020]. Retrieved from the Internet: URL: <https://polymerdatabase.com/Commercial%20Polymers/PEI.html>, 2 pages.
Goodfellow©, Polyetherimide (PEI), [online], [retrieved on Jun. 16, 2020], Retrieved from the Internet: URL: <http://www.goodfellow.com/E/Polyetherimide.html>, 4 pages.
Third Office Action for Chinese Patent Application No. 201680081159.8 dated Jul. 3, 2020 with English language translation provided by Unitalen Attorneys at Law, 21 pages.
Yang, Chaocong ed., Metallic Materials, NeuPress (2014), pp. 153-160; ISBN: 978-7-5517-0567-7.

\* cited by examiner

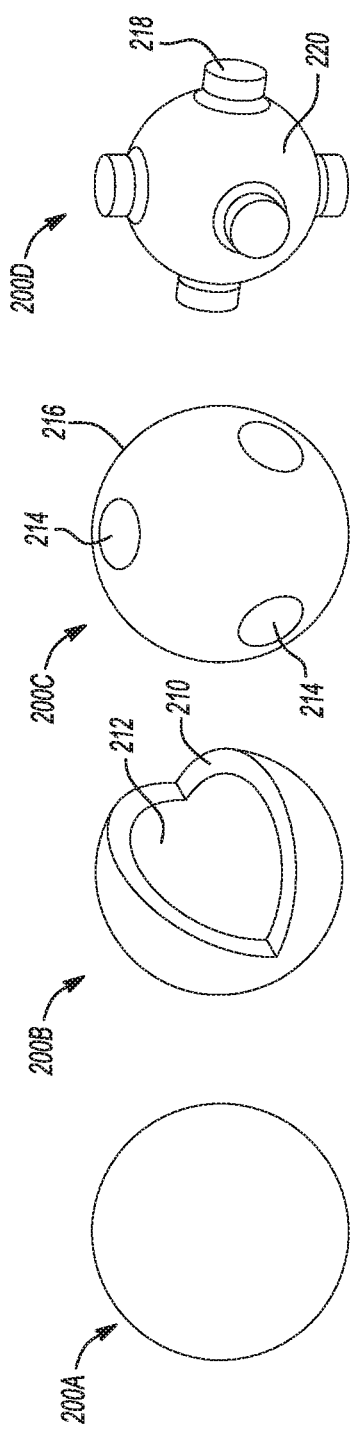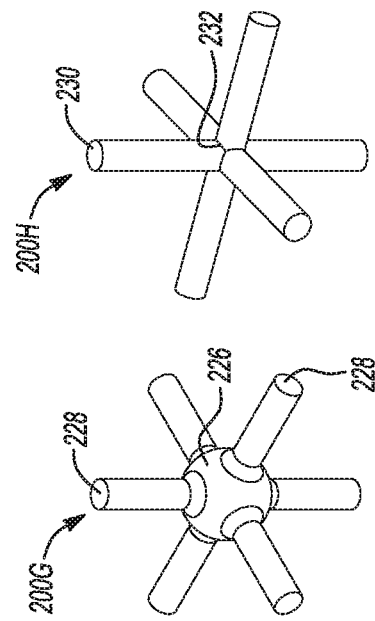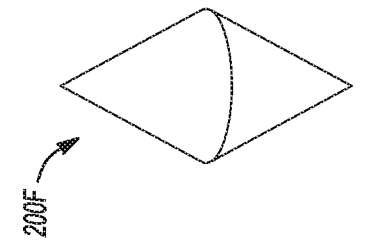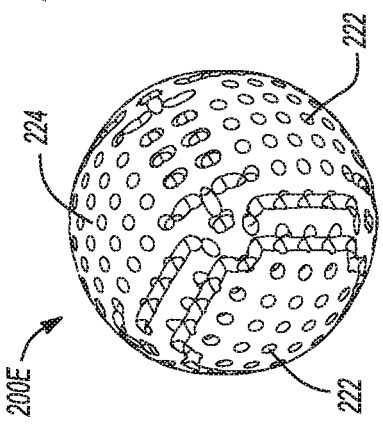

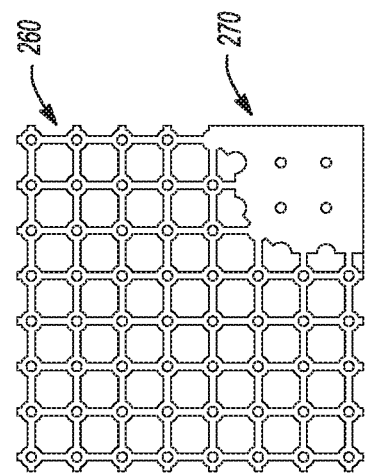
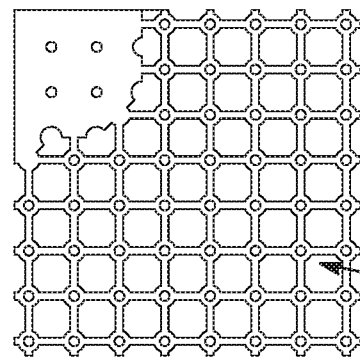
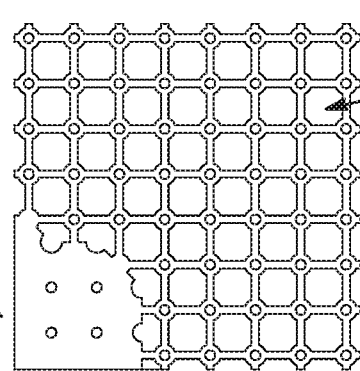
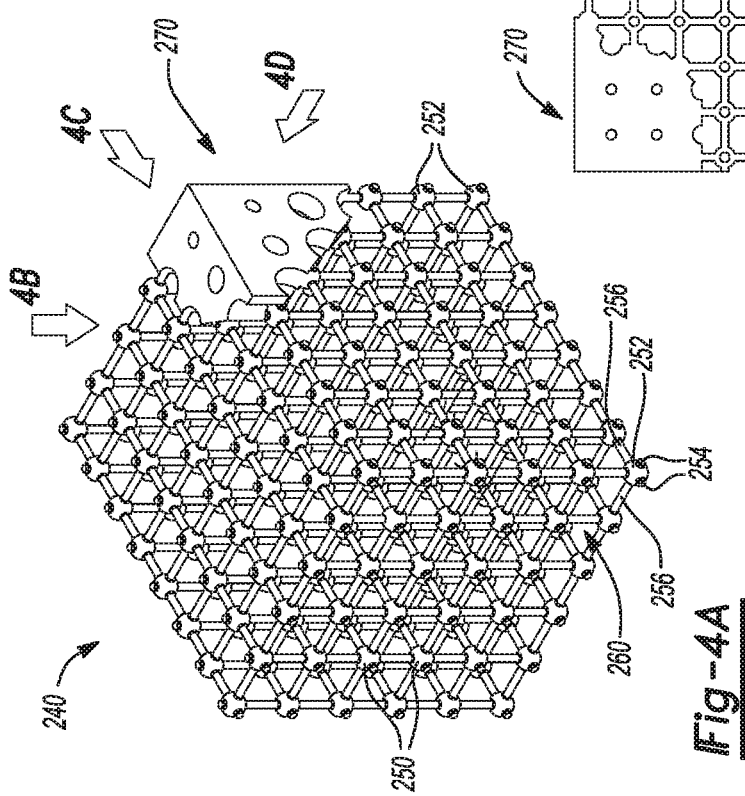
Fig-4A
Fig-4B
Fig-4C
Fig-4D

Cantilever Beam, End Load $$\sigma = \frac{PL}{Z} \quad \Delta = \frac{PL^3}{3EI}$$

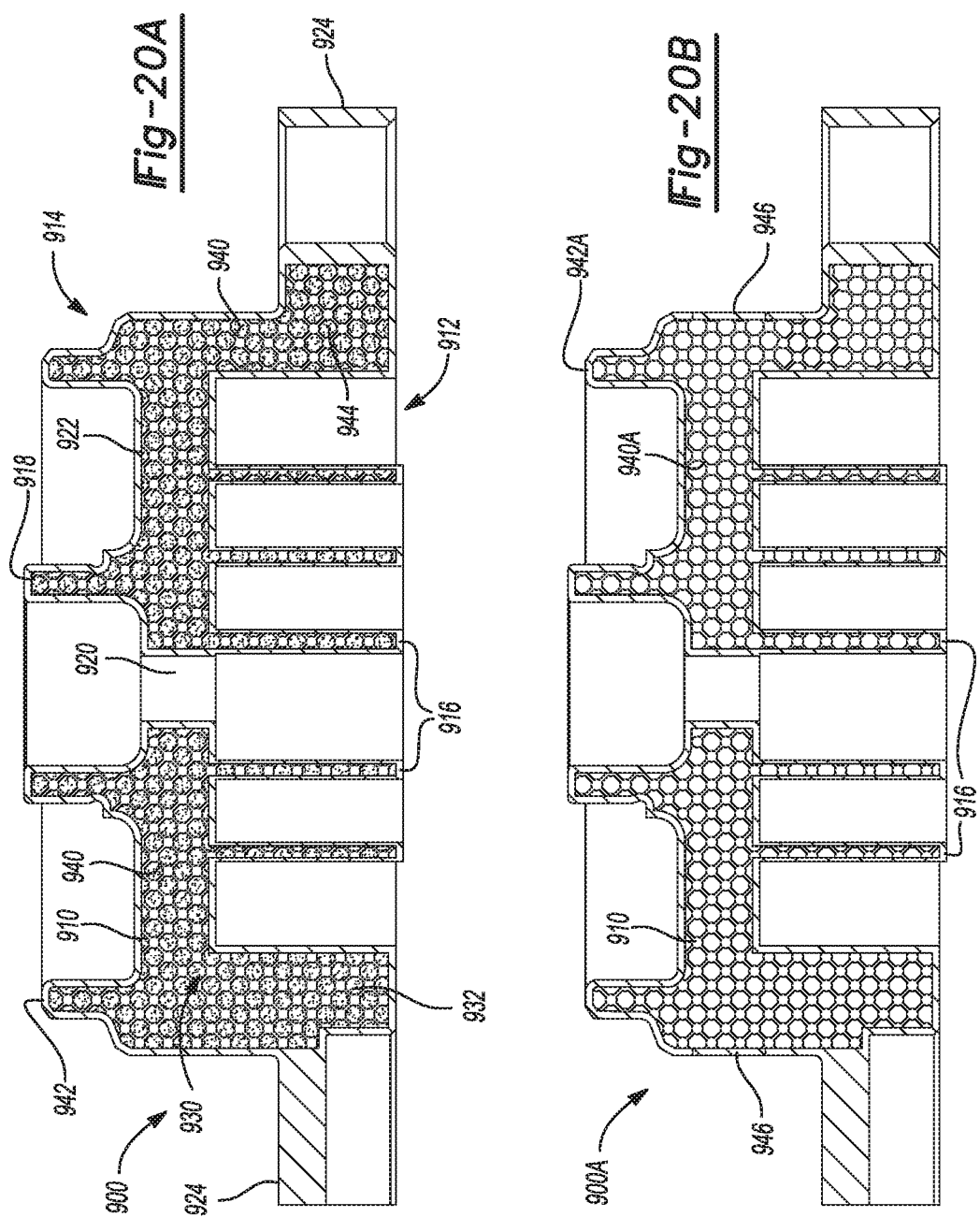

HIGH-STRENGTH LIGHT-WEIGHT LATTICE-CORED ADDITIVE MANUFACTURED COMPRESSOR COMPONENTS

CROSS-REFERENCE TO RELATED APPLICATIONS

This application claims the benefit of U.S. Provisional Application No. 62/387,119, filed on Dec. 23, 2015. The entire disclosure of the above application is incorporated herein by reference.

FIELD

The present disclosure relates to improved high-strength, light-weight components for compressors created by additive manufacturing having predetermined stiffness and deflection properties.

BACKGROUND

This section provides background information related to the present disclosure which is not necessarily prior art.

Compressors may be used in heating and cooling systems and/or other working fluid circulation systems to compress and circulate a working fluid (e.g., refrigerant) through a circuit having a heat exchanger and an expansion device. Efficient and reliable operations of the compressor are desirable to ensure that the system in which the compressor is installed is capable of effectively and efficiently providing a cooling and/or heating effect. Weight reduction for components to be incorporated into compressors (e.g., scroll compressors) is important for improving compressor and refrigeration system efficiency, especially in mobile applications. However, many lightweight materials that are potential candidates for forming compressor components fail to exhibit adequate strength along with desired material properties (stiffness or deflection), and/or long-term durability when exposed to the harsh temperature and pressure conditions during compressor operation. Further, certain high-strength materials also have a correspondingly high stiffness, which can cause excessive wear when forces or loading is applied during compressor operation. It would be desirable to have high-strength, light-weight compressor components that advantageously control stiffness and deflection within a compressor during compressor operation to improve compressor performance and efficiency, while reducing manufacturing process complexity.

SUMMARY

This section provides a general summary of the disclosure and is not a comprehensive disclosure of its full scope or all of its features.

In various aspects, the present disclosure provides light-weight, high-strength compressor components having controlled stiffness and/or deflection levels within the compressor component formed. In certain variations, a light-weight high-strength compressor component to be incorporated into a compressor comprises a body portion having at least one interior region that comprises a lattice structure. The lattice structure comprises a plurality of cells formed via additive manufacturing and a surface disposed over the lattice structure. In certain aspects, the compressor component has a tensile strength of greater than or equal to about 32,000 psi (about 220 MPa).

In other variations, the present disclosure provides a light-weight, high-strength compressor component that comprises a body portion having at least one interior region that comprises a lattice structure. The lattice structure comprises a plurality of cells formed via additive manufacturing and a surface disposed over the lattice structure. The body portion comprises a first region having a first stiffness and a second region having a second stiffness distinct from the first stiffness. In certain aspects, the first region may also have a first deflection level and the second region has a second deflection level distinct from the first deflection level.

In yet other variations, the present disclosure provides a method of making a light-weight, high-strength compressor component comprising applying energy in a predetermined pattern to a powder precursor to create a fused solid structure via an additive manufacturing process. The fused solid structure defines a compressor component having a lattice structure. The lattice structure comprises a plurality of cells formed in an interior region. The compressor component has a tensile strength of greater than or equal to about 32,000 psi (about 220 MPa).

The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A-2K show a perspective view of representative distinct nodes for incorporation into lattice structures formed via additive manufacturing in accordance with certain principles of the present disclosure.

FIGS. 4A-4D illustrate varying density within unit cells of a lattice structure for incorporation into high-strength, light-weight compressor components to form regions with greater levels of reinforcement and strength. FIG. 4A is a side view of the lattice structure, while FIGS. 4B-4D are sectional top and side views.

Figure 8A:
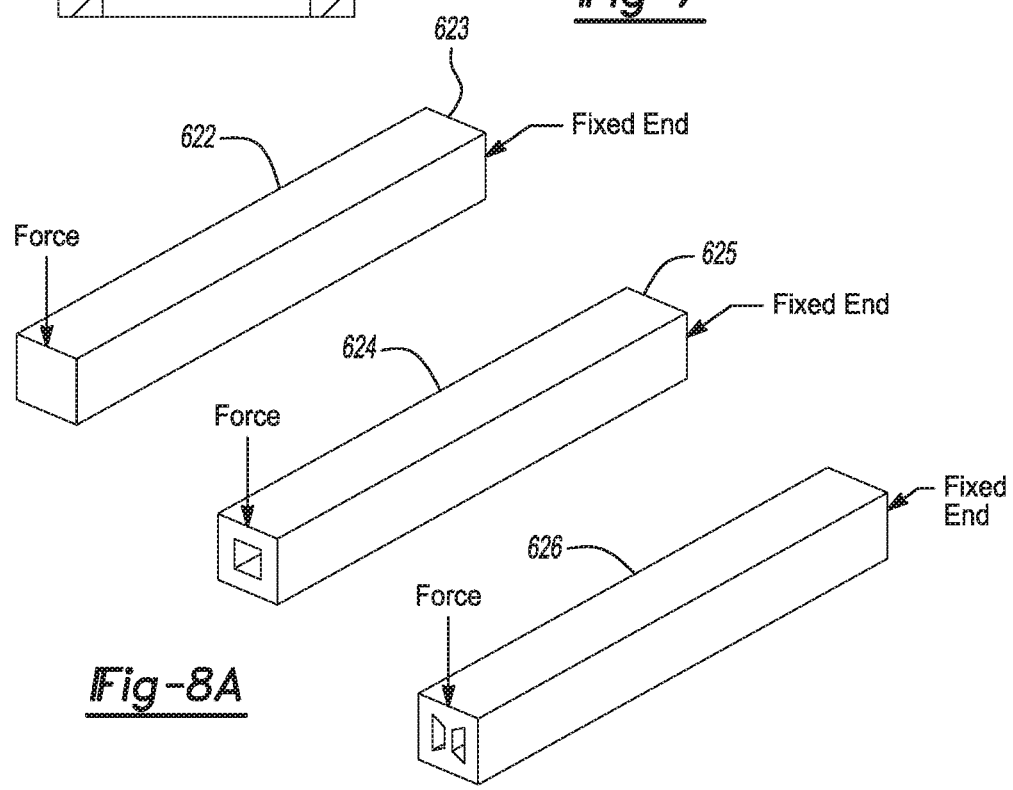
Figure 8B:
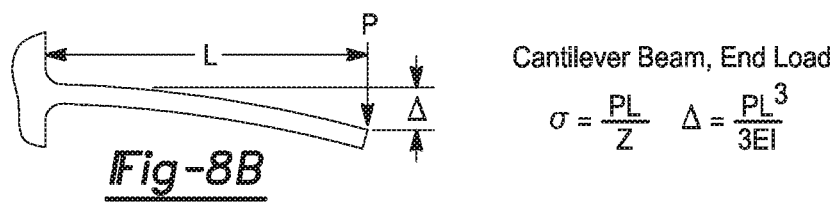

FIGS. 8A-8B show cantilevered beams for testing deflection levels for different reductions in weight. FIG. 8A shows three cantilevered beams for testing, including a solid beam, a beam having a hollow center, and a beam having a dual-chambered hollow center. FIG. 8B shows a schematic of the deflection testing of a cantilevered beam.

Figure 9:
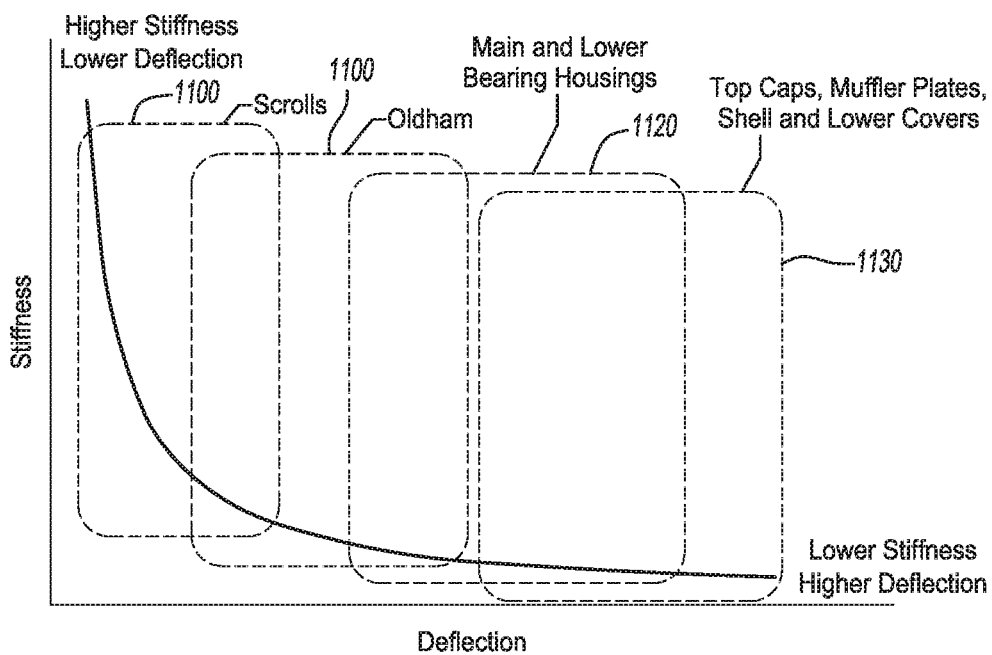

FIG. 9 shows an exemplary chart of deflection versus stiffness for certain select representative scroll compressor components to demonstrate the relationship of deflection versus stiffness requirements.

Figure 10:
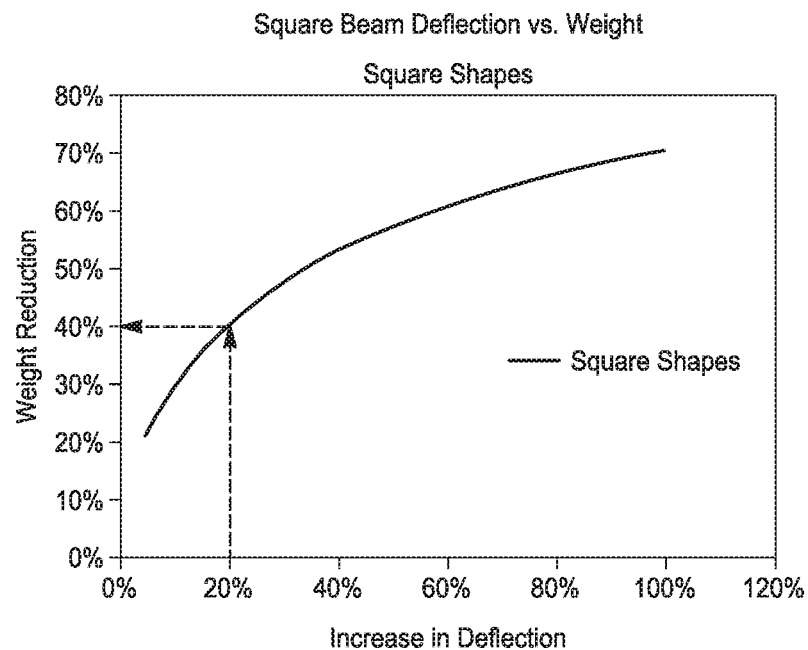

FIG. 10 shows representative calculations of deflection versus weight for a representative square beam shape.

Figure 11:
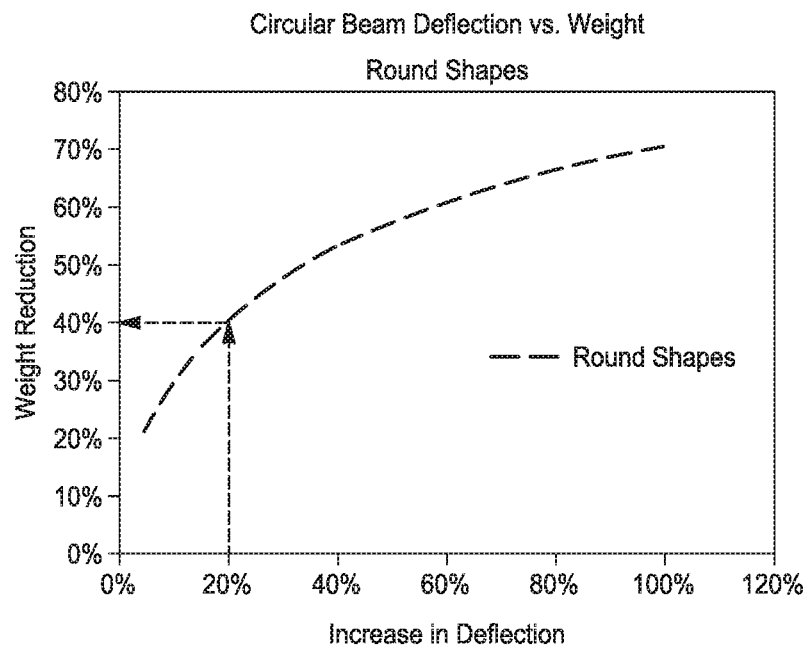

FIG. 11 shows representative calculations of deflection versus weight for a representative circular or round beam shape.

Figure 12:
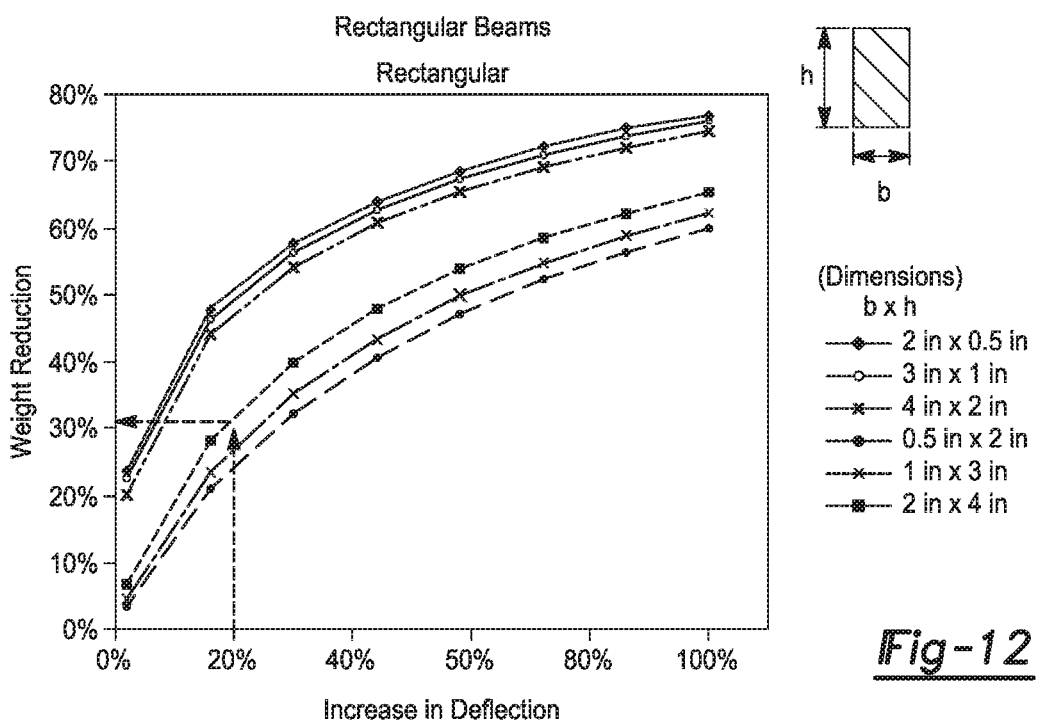

FIG. 12 shows representative calculations of deflection versus weight with various rectangular elongated beam shapes having different cross-sectional dimensions.

Figure 13:
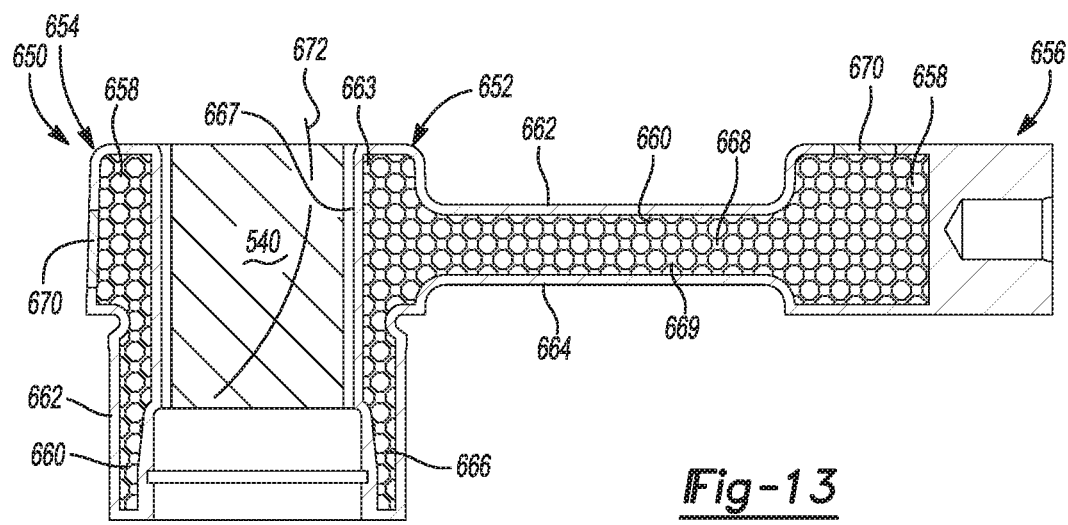

FIG. 13 is a high-strength, light-weight lower bearing housing assembly formed in accordance with certain aspects of the present disclosure that incorporates one or more internal lattice structures to provide localized control over stiffness and deflection levels.

Figure 14A:
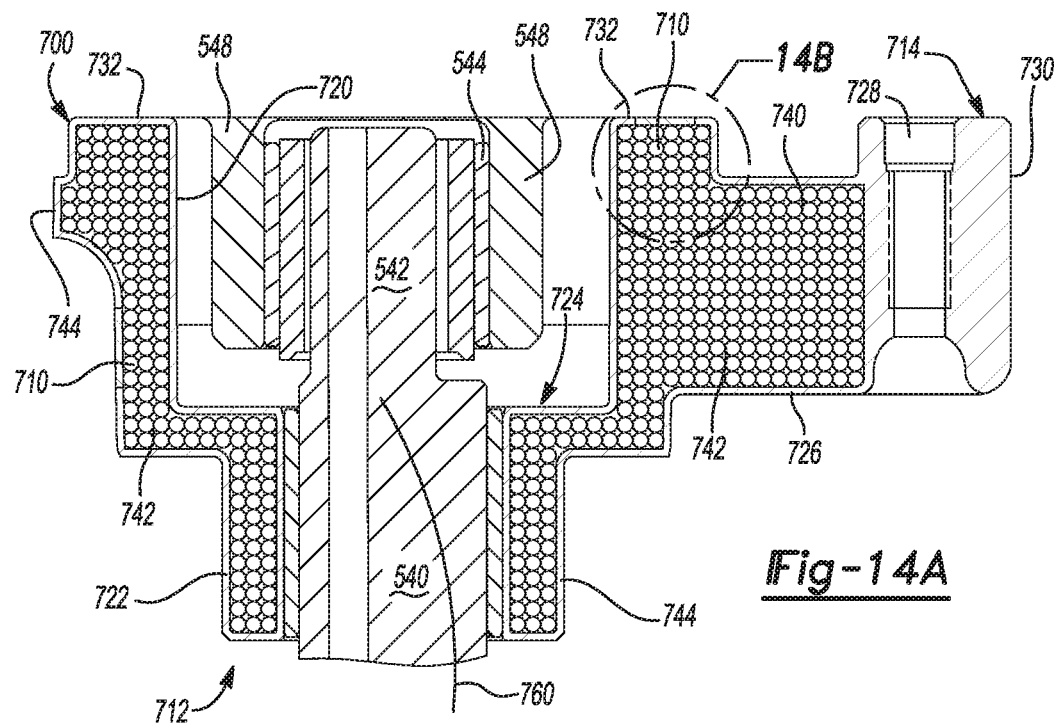
Figure 14B:
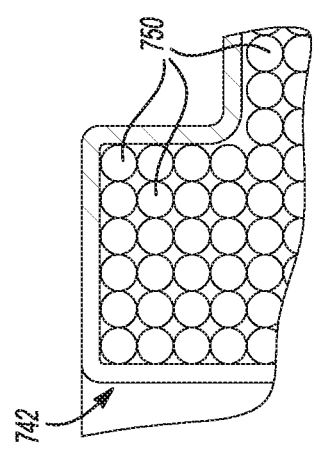

FIGS. 14A-14B show side views of a high-strength, light-weight main bearing housing having exemplary lattice structures to provide localized control over stiffness and deflection levels in accordance with certain aspects of the present disclosure. FIG. 14A shows a side sectional view of the main bearing housing. FIG. 14B is a detailed sectional view of an exemplary lattice structure prepared in accordance with the present disclosure.

Figure 15:
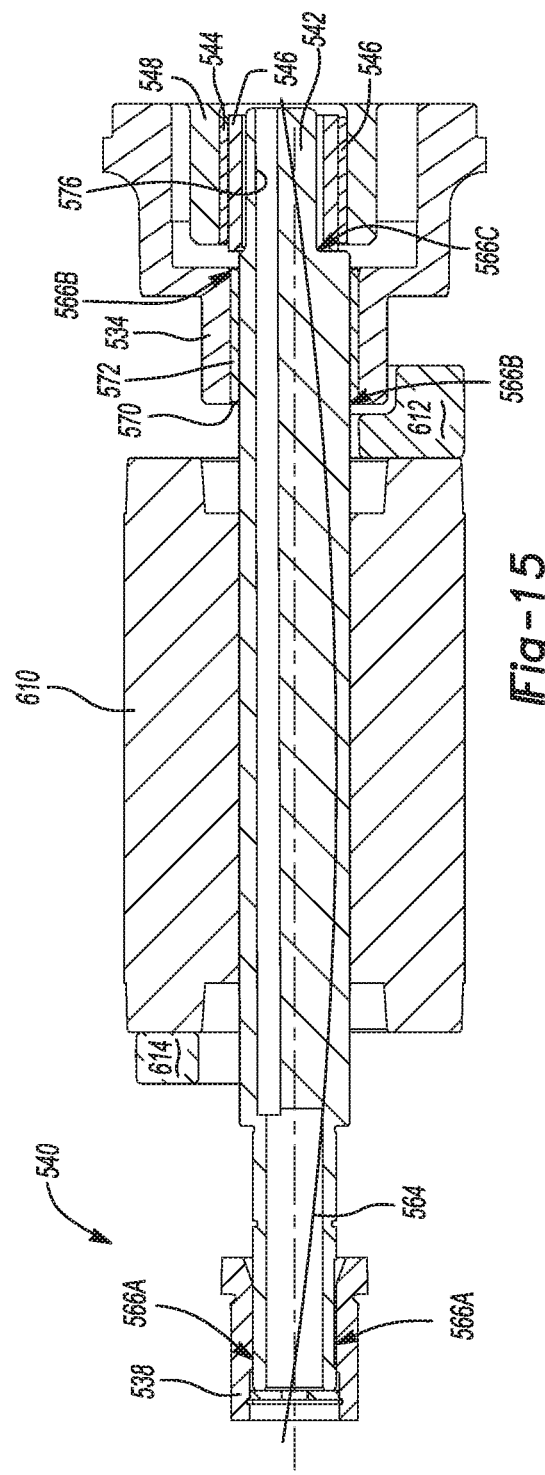

FIG. 15 is a sectional view of a crankshaft formed of a solid structure made via conventional manufacturing techniques.

Figure 16:
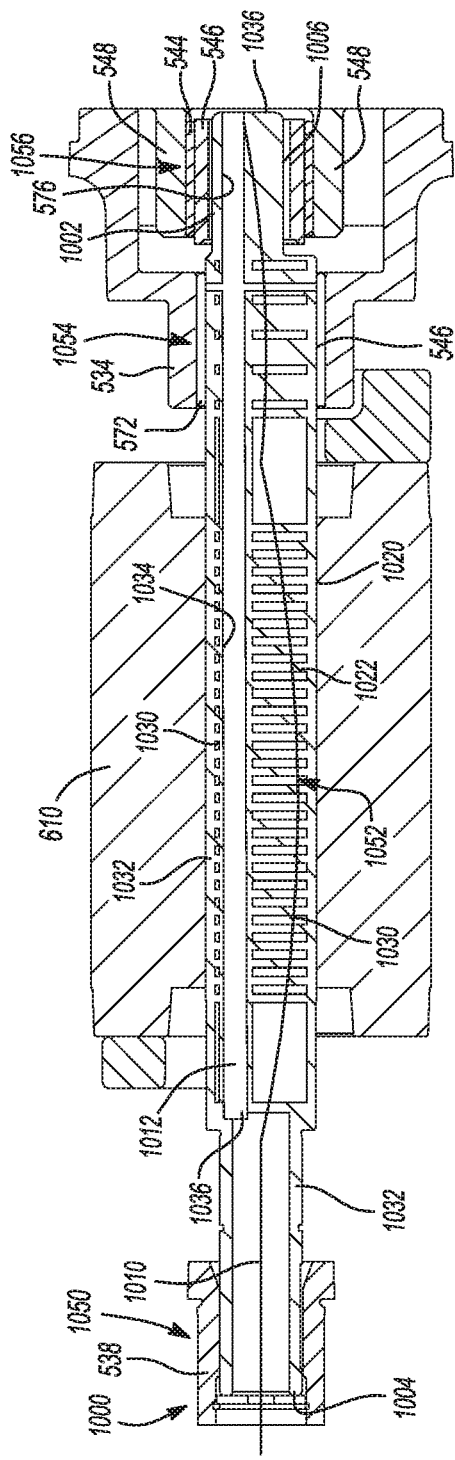

FIG. 16 is a high-strength, light-weight lower bearing housing assembly formed in accordance with certain aspects of the present disclosure that incorporates one or more internal lattice structures to provide localized control over stiffness and deflection levels.

Figure 17:
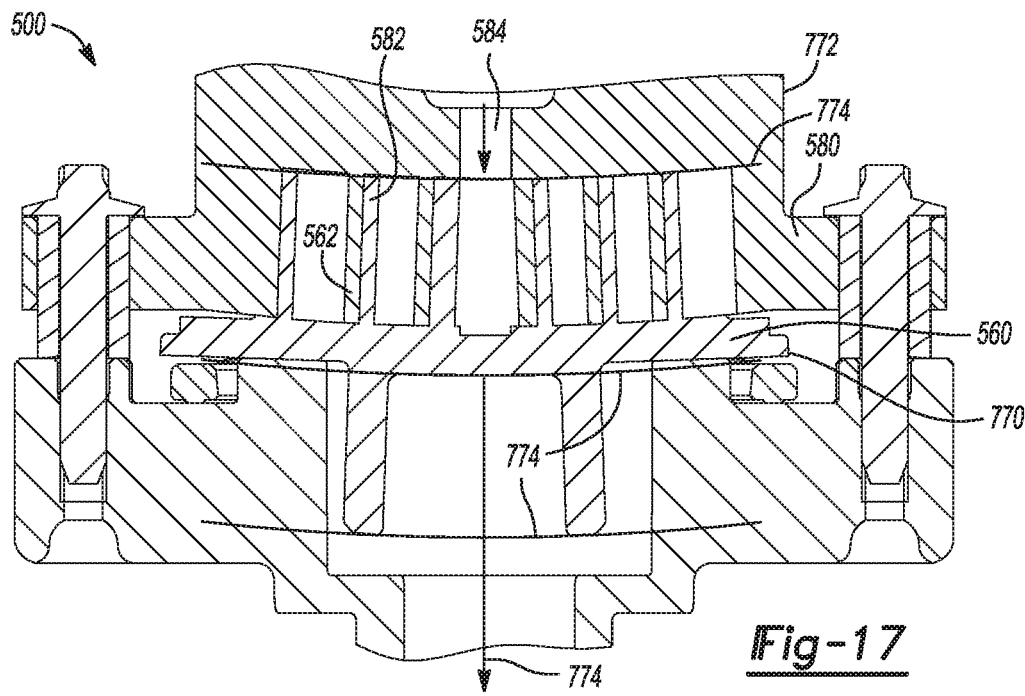

FIG. 17 shows a compression mechanism for a conventional scroll compressor including an orbiting scroll member and a non-orbiting scroll member that experiences significant distortion and bending due to high pocket pressures in the compression mechanism.

Figure 18:
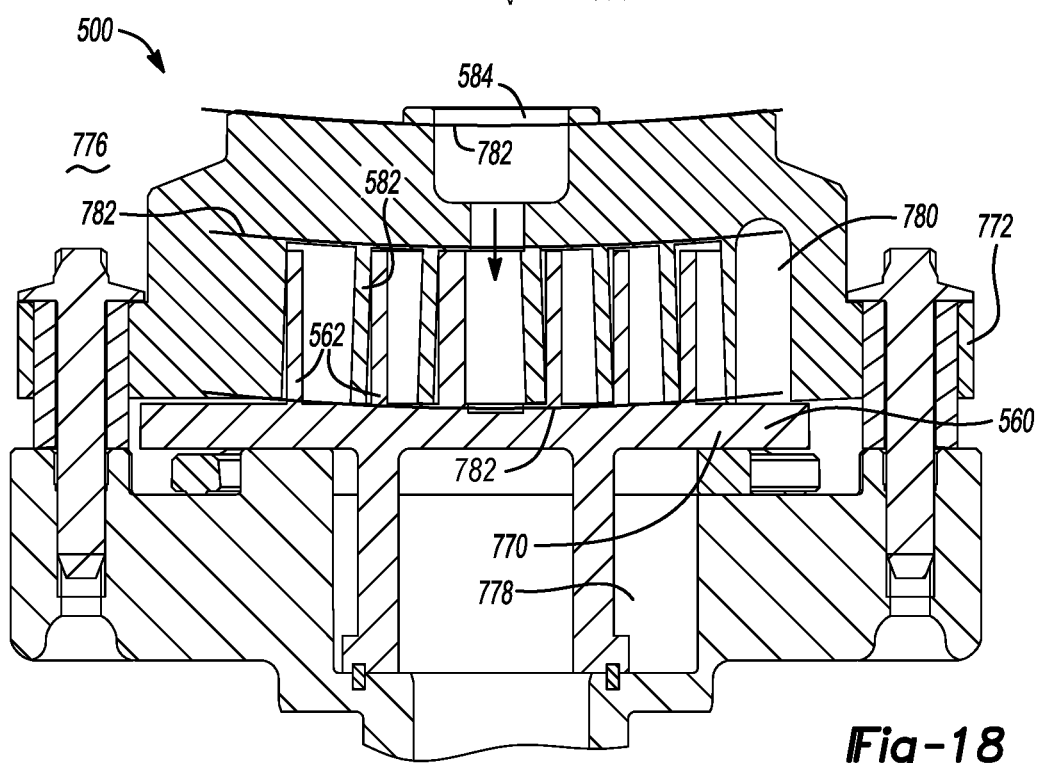

FIG. 18 shows a compression mechanism for a conventional scroll compressor including an orbiting scroll member and a non-orbiting scroll member that experiences significant distortion and bending due to a high-side pressure design.

Figure 19A:
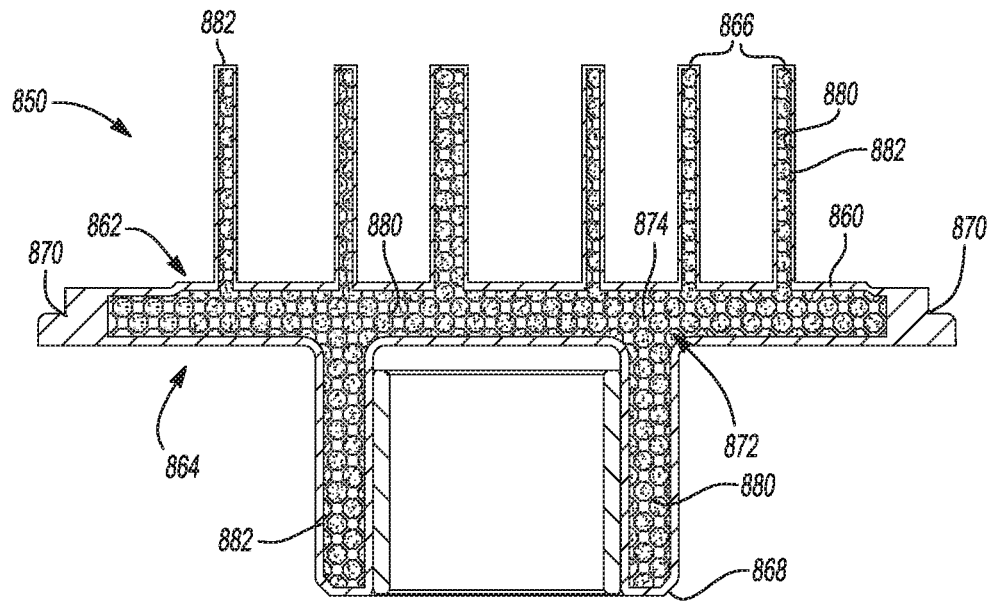
Figure 19B:
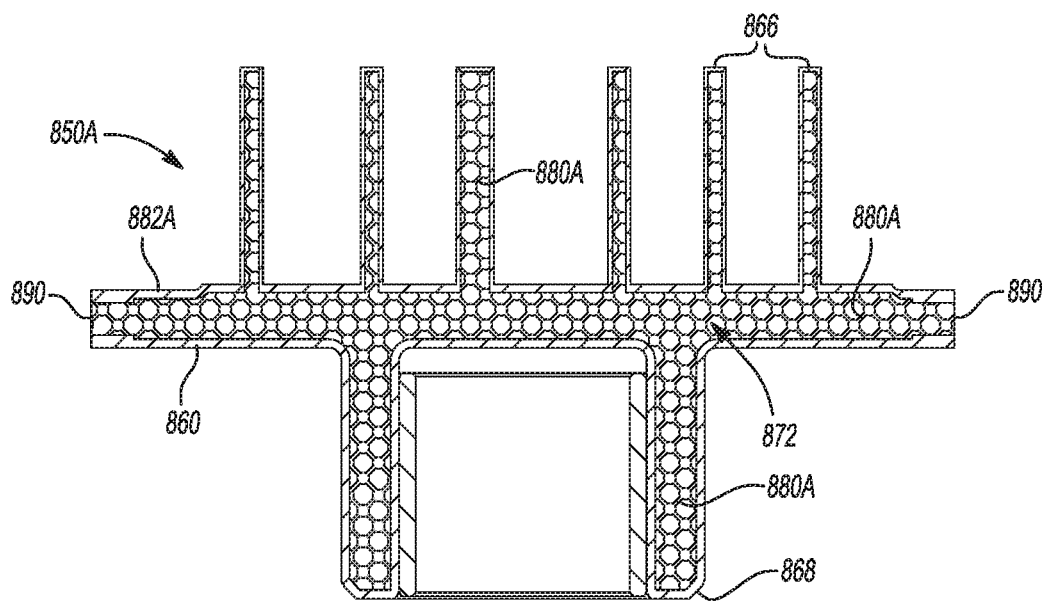

FIGS. 19A-19B show side views of alternate variations of high-strength, light-weight orbiting scroll compressor components made in accordance with the present disclosure that provide control over stiffness and deflection levels. In FIG. 19A, a plurality of loose residual particles remains in the void regions of a lattice structure after additive manufacturing. In FIG. 19B, removal holes are disposed in a surface of the orbiting scroll component, so that void regions in the lattice are empty after removal of loose residual particles through the removal holes after additive manufacturing.

FIGS. 20A-20B show side views of alternate variations of high-strength, light-weight non-orbiting scroll compressor components made in accordance with the present disclosure that provide control over stiffness and deflection levels. In FIG. 20A, a plurality of loose residual particles remains in the void regions of a lattice structure after additive manufacturing. In FIG. 20B, removal holes are disposed in a surface of the non-orbiting scroll component, so that void regions in the lattice are empty after removal of loose residual particles through the removal holes after additive manufacturing.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters.

In addition, disclosure of ranges includes disclosure of all values and further divided ranges within the entire range, including endpoints and sub-ranges given for the ranges.

In various aspects, the present disclosure pertains to compressors that incorporate relatively high-strength, light-weight components having a body portion or internal region defining a lattice structure or cellular material. In addition to exhibiting improved or increased strength to weight ratios, the compressor components formed in accordance with certain aspects of the present disclosure also provide an ability to control and customize a predetermined stiffness level and/or predetermined deflection level within a given component. In this manner, the high-strength, light-weight compressor components of the present disclosure improve compressor operation efficiency and durability by controlling the stiffness or deflection level required. Furthermore, the stiffness or deflection levels can be varied within the component itself (e.g., localized control over stiffness and/or deflection) to optimize compressor performance and durability.

Figure 1:
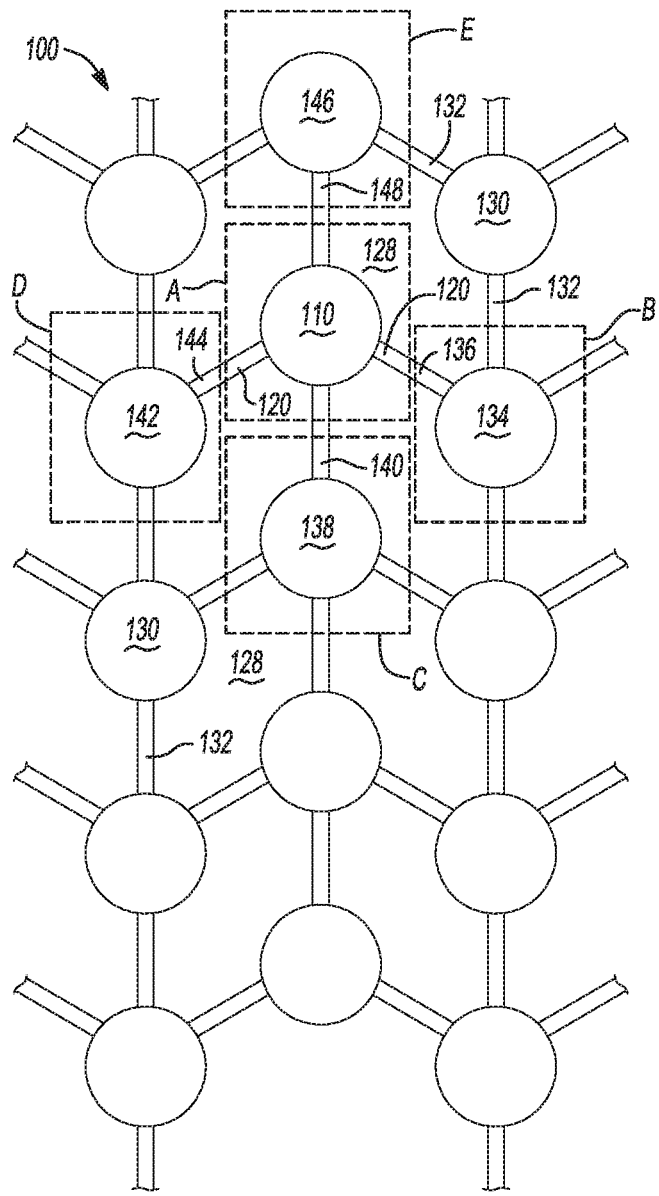
FIG. 1 shows a sectional view of an exemplary lattice structure formed via additive manufacturing in accordance with certain principles of the present disclosure.

In various aspects, the present disclosure provides a component for a compressor comprising at least one region defining a lattice structure or cellular material. In certain aspects, the region may be an internal or core region of a structural body portion of the component. An internal or core region is one that has a continuous surface formed over the lattice structure where the lattice structure would be exposed to an external environment. The component for the compressor may be an integrally formed, single piece or unitary structure, for example, a monolithic structure. Generally, a lattice structure includes a plurality of cell units that form a repeating structure. By way of non-limiting example, a two-dimensional lattice representative lattice structure 100 is shown in FIG. 1 that includes solid structures that define the lattice. The solid structures in the lattice structure 100 may include at least one node 110 and at least two connecting branches or bridge structures 120 attached to the node 110. Generally, a connecting bridge structure 120 extends between two nodes. Thus, a cell unit (marked by the outline "A") is formed that has the node 110 and the bridge structures 120. While not shown in the exemplary lattice structure 100 in FIG. 1, a unit cell may have a plurality of nodes, as well as a plurality of connecting branches or bridge structures. The cell units are regularly repeated within the lattice structure.

The lattice structure 100 may include a plurality of nodes 130 that may be interconnected with one another within a unit cell by one or more connecting branches/bridge structures 132. Such nodes 130 and connecting structures 132 are preferably formed of a solid material, such as a metal. The nodes 130 may be solid structures or may have hollow cores or interiors. In certain other variations, where the nodes or other structures within the lattice are hollow, they may be filled with a material, such as a powder. The material may also include engineered polymers, polymers including elastomers, polymeric composites having reinforcing materials and a matrix, and/or ceramics. In other variations, the hollow nodes or other structures may be filled yet other materials, such as gases or liquids, including refrigerants, oils, air, and the like, or there may be negative pressure or vacuum conditions in the hollow void regions.

The open lattice design of the lattice structure 100 is defined by the nodes 130 and connecting structures 132 and creates one or more open or void regions 128, where the solid structures are absent. Notably, the one or more void regions 128 may occupy a contiguous substantial volume of the unit cell and thus are distinguishable from a porous material having micropores or nanopores, but generally forming a solid porous structure. Notably, the solid structures in the lattice may be porous materials, but porous regions are distinguishable from the larger macroscale void regions. In certain aspects, the connecting structures may be relatively small or omitted altogether (e.g., where a plurality of nodes are in direct contact with one another, but still define regular repeating unit cells).

In certain aspects, respective cell units may be connected to one or more adjacent cell units to define an interconnected lattice structure. Thus, the connecting structures may extend from a first node within the unit cell to a second node in an adjacent unit cell. For example, in lattice structure 100 the node 110 in cell unit A may be connected to four distinct nodes 130 in adjacent unit cells. Thus, node 110 in cell unit A is connected to a first adjacent node 134 in adjacent cell unit B via a first bridge 136. Node 110 is connected to a second adjacent node 138 in adjacent cell unit C via a second bridge 140. Third adjacent node 142 in adjacent cell unit D is connected via a third bridge 144 to node 110. Lastly, a fourth adjacent node 146 in adjacent cell unit E is connected to node 110 by a fourth bridge 148. Notably, the exemplary lattice structure 100 is only shown in two dimensions; however, the nodes and connecting structures may also extend between unit cells and layers in three dimensions.

By way of non-limiting example, in certain variations, the unit cells may have a maximum dimension of greater than or equal to about 0.1 mm to less than or equal to about 10 mm and thus are referred to as "meso-structured" or non-foaming materials, having a scale generally between micro and macro scales. The number, position, size, and shape of the nodes and connecting structures in each unit cell of the lattice structure may vary, but preferably form a repeating structure that creates a cellular material.

Figure 2J:
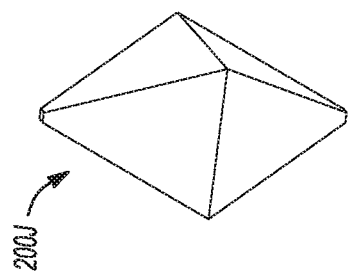
Figure 2K:
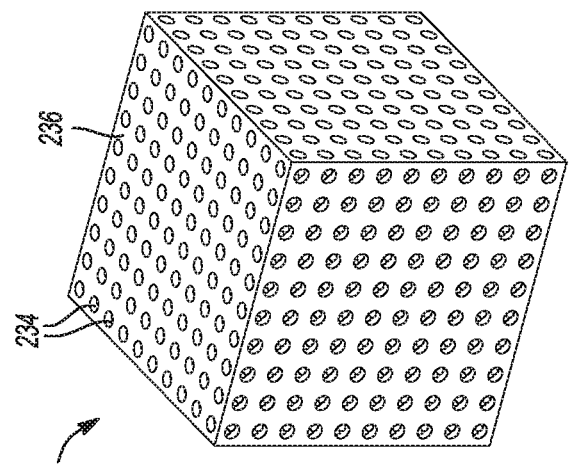
Figure 2I:
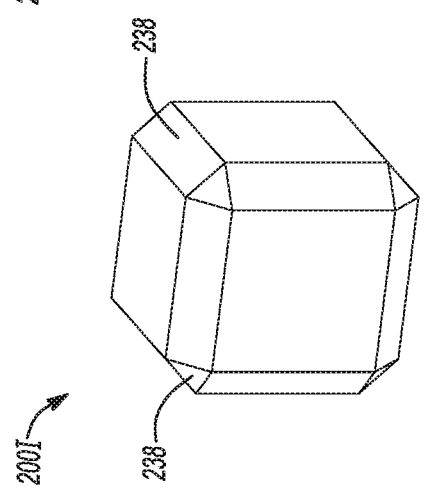

FIGS. 2A-2K show a plurality of distinct non-limiting node shapes. In FIG. 2A, a node 200A is a sphere. In FIG. 2B, a node 200B is a hollow sphere having a spherical shell 210 and a hollow interior 212. In FIG. 2C, a node 200C is a sphere with flat portions 214 disposed at regular intervals about a spherical surface 216. Notably, the number of flat portions 214 and spacing between them can vary from those shown. It should also be noted that this node can be hollow similar to node 200B. In FIG. 2D, a node 200D is a sphere that has a plurality of posts 218 disposed at regular intervals about a spherical surface 220. It should also be noted that this node can be hollow similar to node 200B. In FIG. 2E, a node 200E is a porous sphere having a plurality of small pores 222 (e.g., micropores or micropores) formed within a body 224 of the node 220E. In FIG. 2F, a node 200F has a double-cone shape. In FIG. 2G, a node 200G has a star sphere shape that includes a central sphere portion 226 with a plurality of radiating arms 228 extending from the central sphere portion 226. In FIG. 2H, a node 200H is a star having a plurality of radiating arms 230 connected to one another at a central region 232. In FIG. 2K, a node 200K has a cube shape and is porous having a plurality of small pores 234 (e.g., macropores or micropores) formed within a body 236 of the node 200K. In FIG. 2I, a node 200I has a cube shape shown with beveled edges 238. In FIG. 2J, a node 200J has a double pyramid or double diamond shape. It should be noted that a variety of other similar shapes may be used as a node, for example, a sphere is merely being representative of any round shape, including ovals or ellipsoids, and a cube may be any rectangular shape. Three dimensional polygonal or polyhedrons (e.g., hexagonal polygonal prism/honeycomb) and other more complex node shapes are likewise contemplated.

In certain variations, the light-weight high-strength compressor has a lattice structure with a cell comprising a node having a shape selected from the group consisting of: a sphere (e.g., a hollow sphere or solid sphere), a modified sphere comprising one or more flat surface regions, a sphere comprising posts, a cone, a double-cone, a pyramid, a diamond, a star, a cube, a polyhedron, an irregular asymmetrical globular shape (e.g., an irregular non-linear/globular shape like an amoeba), and combinations thereof. In other variations, the node is selected from the group consisting of: a solid sphere, a porous sphere, a hollow sphere, a hollow sphere comprising a core filled with a plurality of particles, and combinations thereof. In other variations, the node may have an asymmetrical shape and is not required to have straight-lines or symmetry. For example, an irregular/globular (nonlinear)-shaped node with a curved outer perimeter (e.g., an amoeba shape) can be used as a repeating unit throughout the lattice.

As generally understood by those of skill in the art, the design of the lattice core structures (for example, node shape, bridge/arm design, length, and angles between the nodes and bridges) can be varied depending upon the application. Specifically, the directionality of the mechanical stress is an important consideration. For example, one lattice structure optimal for reducing mechanical stress or load transfer in the plane of the component may require a different structure if the stress or load was primarily traveling in a direction normal to the component. The direction, distribution, and amount of mechanical stress applied will dictate the type of lattice structure that is optimal. Strength (e.g., resistance to torsion, tension, bending, and the like) will generally be dependent upon the orientation of the lattice relative to the direction of stress. That is, in some cases it is desirable to orient the latticework so that during deflection, the lattice is stressed in compression, which will tend to maximize the strength of the component. In other cases the reverse may be the goal, whereby more deflection is desirable (and thus less component strength).

Figure 3C:
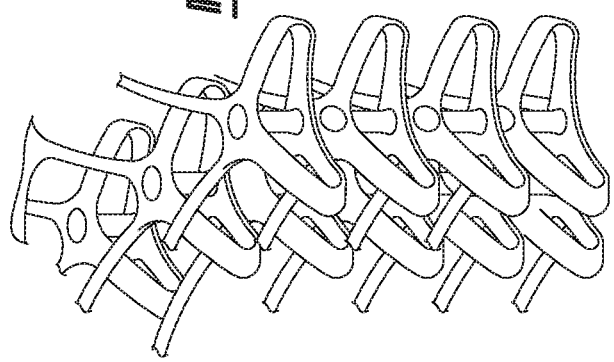
FIGS. 3A-3H show side views of exemplary distinct lattice structures for incorporation into high-strength, light-weight compressor components in accordance with certain variations of the present disclosure.
Figure 3E:
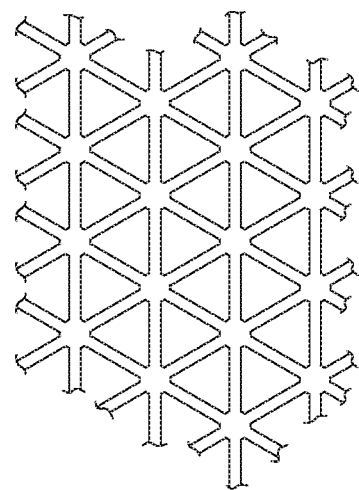
Figure 3B:
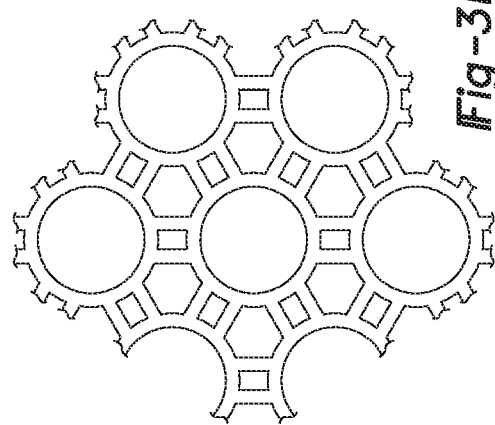
Figure 3D:
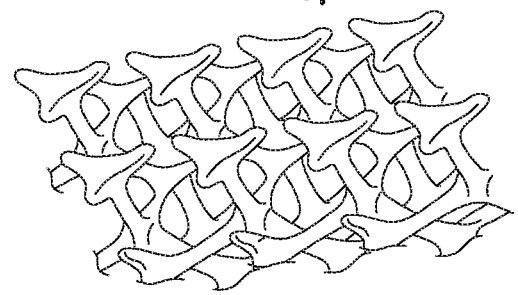
Figure 3A:
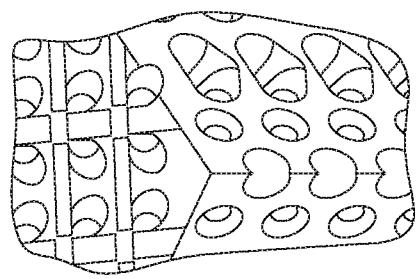
Figure 3F:
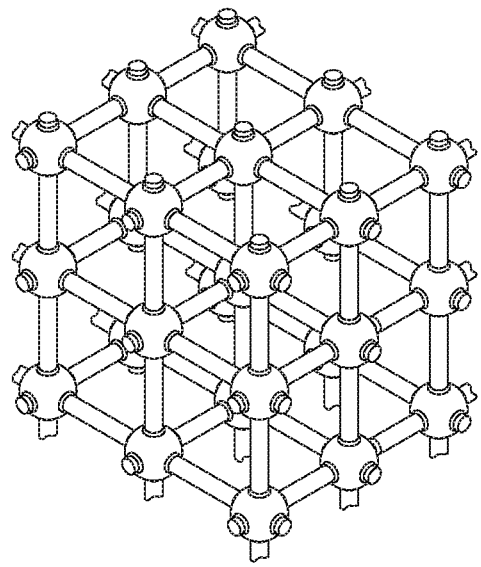
Figure 3G:
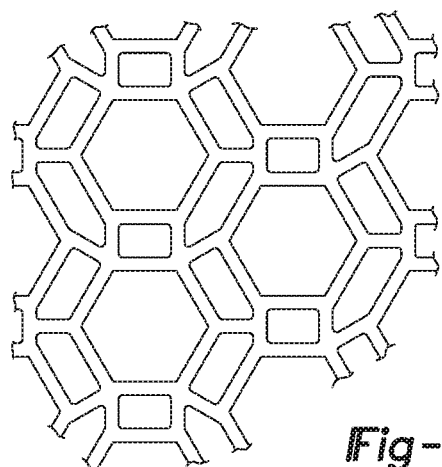
Figure 3H:
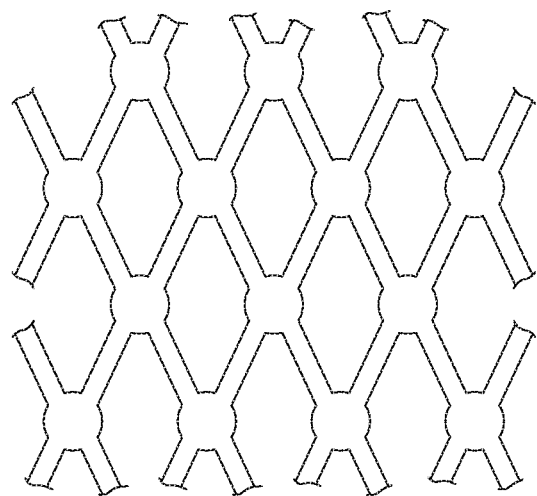

FIGS. 3A-3H show exemplary distinct lattice structures that may be employed in accordance with certain variations of the present disclosure. Notably, the respective lattice structures represent different nodes and different connecting structures within each respective unit cell that together define the lattice structure. For example, FIG. 3A represents a lattice structure that can provide high stiffness in all directions. FIGS. 3B and 3G are sphere-based lattices providing benefits associated with spherical structures. FIG. 3C is a lattice structure that can provide impact absorption, without losing lateral stability. FIGS. 3E and 3F are lattice structures that can be employed for multi-directional loading. FIGS. 3D and 3H are relatively simple lattice structures that can provide structural rigidity along with certain desired cushioning effects. These lattice structures can also provide thermal advantages. Further, while not shown, the lattice structure may be encased by a solid surface or continuous outer skin. It should be noted that a solid surface or continuous skin can also be formed on internal channels or flow structures formed internally within the lattice structure.

FIGS. 4A-4D illustrate that a density of the unit cells may be altered through the lattice structure to create regions with greater levels of reinforcement corresponding to higher density as compared to regions of lower density with somewhat less strength. In compressor components, the ability to control cell density and thus strength in certain regions is particularly advantageous, as certain select regions of the components may experience high levels of force and stress during operation of the compressor. Designed cellular materials provide an ability to only locate solid material where it is needed mechanically for a specific application.

In FIGS. 4A-4D, an exemplary lattice structure 240 is shown that has a plurality of nodes 250 formed of a sphere 252 with posts 254 (similar to the node shown in FIG. 2G). The lattice structure 240 includes a plurality of connecting bridges 256 extending between nodes 250. FIG. 4B is a top view of the structure in FIG. 4A in a direction of the arrow labeled "B," FIG. 4C is a view from behind the cube facing towards the front in a direction labeled "C," while FIG. 4D is a view from the side in a direction of the arrow labeled "D." As can be seen in a first region 260 of the lattice structure 240 the cells have a first density (having a first ratio of solid structure to void region within each unit cell). A second region 270 of the lattice structure 240 has a second density (having a second ratio of solid structure to void region within each unit cell). The first ratio is less than the second ratio, meaning the volume occupied by a solid structure in the second region 270 is greater than the volume occupied of the solid structure in the first region 260. In this manner, the second region 270 can be considered to have a higher density than the first region 260 within the lattice structure 240.

Figure 5:
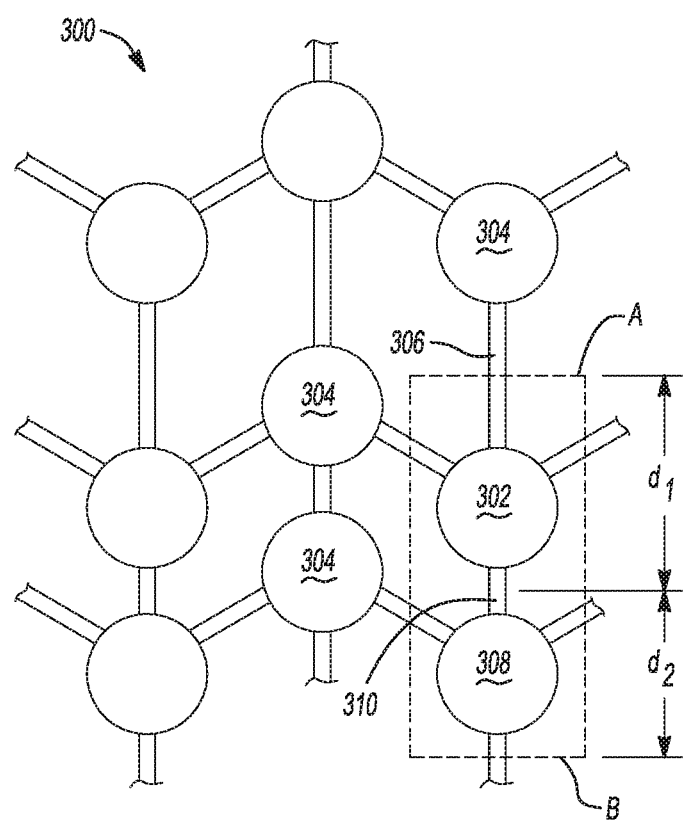
FIG. 5 shows a sectional view of another exemplary lattice structure formed via additive manufacturing in accordance with certain principles of the present disclosure, where the size of unit cells and thus cell density is varied within the lattice structure.

It should be noted that in other variations, depending upon the application, the size of unit cells may be selected to be smaller in a first region for a predetermined volume of the lattice structure as compared to a size of unit cells in other regions, so that the first region may be considered to have a higher density of cells for the predetermined volume. Such a concept is shown generally in FIG. 5, where a lattice structure 300 has a first cell unit A with a first node 302 connected to other distinct nodes 304 in other adjacent unit cells via connecting structures 306. The first unit cell A has a first dimension or length "$d_1$." A second unit cell B has a second node 308 connected to other distinct nodes 304 in adjacent cells via connecting structure 310. The second unit cell B has a second dimension of length "$d_2$." Connecting structures 306 are generally longer in the first unit cells A than the connecting structures 310 in the second unit cells B. Notably, the exemplary lattice structure 300 is only shown in two dimensions; however, the nodes and connecting structures may also extend between unit cells and layers in three dimensions. Thus, distances "$d_1$" and "$d_2$" of each cell can be varied within the lattice structure (in three dimensions) to create cells having different densities in different regions of the lattice structure. Thus, increasing the solid to void ratio within a cell is one variation of increasing density in the lattice structure, while reducing the size of the cell per unit volume and thus increasing the ratio of solid to void in a predetermined volume of the lattice is another variation of increasing cell density.

Compressor components having such lattice structures can be formed by additive manufacturing techniques. Indeed, additive manufacturing is particularly suitable for forming compressor components having complex geometries. Compressor components having lattice structure regions formed by additive manufacturing can have highly complex and freeform shapes. Certain advantages of additive manufacturing as compared to traditional formation processes, such as machining or metal molding, is that the shapes and passages formed can be conformal and quite complex (e.g., curved, tortuous) and that strength, weight, stiffness and deflection levels can vary within different select areas of a single component. Furthermore, ports, channels, and passage features can be incorporated into the complex shape formed from additive manufacturing including the lattice structure.

A digital three-dimensional modeling system can be used to first form a digital model of the compressor component structure, including the desired lattice design in the one or more preselected regions. The physical structure can then be formed from the digital model by direct or additive manufacturing. Direct manufacturing generally refers to direct formation of a scale model of a part or assembly using three-dimensional computer data.

Thus, direct or additive manufacturing techniques may be used to form complex metallic (or polymeric) structures having one or more regions with a lattice structure. Additive manufacturing techniques include direct-metal additive manufacturing processes, like powder bed fusion methods that fabricate complex metallic cellular structures by using a laser or electron beam directed over a bed of metal powder. The laser or electron beam is guided by information provided by the three-dimensional digital model to selectively sinter the metal and create the three-dimensional solid structures. Powder bed fusion processes include laser sintering, laser melting, direct metal laser sintering (DMLS), selective laser sintering (SLS), selective laser melting (SLM), selective heat sintering (SHS), electron beam melting (EBM), and LASERCUSING™ laser melting processes. Other direct manufacturing techniques that may be used for such processes include hybrid direct energy deposition (a combination of milling and laser metal deposition), binder jetting (where a liquid bonding agent is selectively deposited to join powder materials in a bed), stereolithography (SLA), laminated object manufacturing (LOM) or sheet lamination, directed energy deposition, ultrasonic additive manufacturing (UAM), fused deposition modeling (FDM), and solid ground curing (SGC), by way of non-limiting example.

In certain aspects, the present disclosure contemplates methods for making a light-weight, high-strength compressor component. Such a method may include applying energy in a predetermined pattern to a powder precursor to create a fused solid structure via an additive manufacturing process. The powder precursor may be a plurality of metal particles in a bed. In certain variations, as discussed further below, the powder precursor comprises iron alloy particles or aluminum alloy particles. The predetermined pattern of application of energy may be repeated over certain areas and builds three-dimensional solid fused structures. The fused solid structure may be a compressor component having a lattice structure formed in an interior region. Applying energy to the powder precursor can create a sintered porous material. In certain aspects, the additive manufacturing process is selected from the group consisting of: direct-metal additive manufacturing, direct metal laser sintering (DMLS), selective laser sintering (SLS), selective laser melting (SLM), electron beam melting (EBM), stereolithography (SLA), laminated object manufacturing (LOM), fused deposition modeling (FDM), solid ground curing (SGC), and combinations thereof.

In various aspects, the one or more components fabricated by additive manufacturing processes are formed from and comprise a metal material. Suitable materials for additive manufacturing include those available as powder metals. The powder metal precursor may be pre-alloyed. Suitable metals comprise iron or aluminum, and may include iron alloys, like grey iron, stainless steel, copper alloys, tool steels, low alloy steels, titanium alloys, metal matrix composites, aluminum, or aluminum alloys, by way of non-limiting example. Such metals form structures having mechanical properties capable of withstanding stresses, torque, and high pressure conditions for long-term use in a compressor. Some suitable examples of powder metal materials are 17-4 (GP1), 17-4PH, 316L, 440C and 15-5 (PHI) stainless steels; M2, M50, H13, D2, PD1 tool steels; 4140, 4365, 8620 alloy steels; maraging steels, including MS1 maraging steel; NANOSTEEL™ composite alloys, nickel alloys, such as INCONEL™ 625 and 718 alloys and HX nickel alloy (HASTELLOY™ X); MP1 cobalt chrome, nickel copper alloys, metal matrix composites, titanium alloys, like Ti-6Al-4V, alloy 6 (STELLITE™ 6), C276 (HASTELLOY™ C), ANCORTI™ grade 5 and grade 23 as well as aluminum alloys such as AlSi10Mg (casting grade aluminum), some of which are produced by companies such as Sandvik Materials Technology, Hoeganaes Corporation, Kennametal Stellite, and NanoSteel Corporation.

Accordingly, the present disclosure contemplates a compressor component including at least one region defining a lattice structure or cellular material. In certain aspects, such a compressor component may be considered to have a lattice core. By using additive manufacturing processes, the production of compressor components having an internal lattice structure with a solid surface layer is provided. The internal lattice structure can be designed and optimized to provide rigidity and strength, including predetermined stiffness or deflection levels. The design of the lattice also allows for weight reduction in such a component as compared to components formed from conventional formation techniques, due to the void regions in the lattice. This combination therefore provides a strong and lightweight component. In addition to providing high strength and lower weight components, deflection and stiffness can be highly controlled within localized regions in the component, also affording improvements in compressor operation and reliability, including higher efficiency and reduced failure rates.

In certain aspects, the present disclosure pertains to compressors that incorporate relatively high-strength, lightweight components that can have enclosed lattice structures within one or more regions of a body of the part that have a fluid, such as gas or fluids (e.g., air), filling the void regions or a reduced pressure or vacuum within the one or more void regions. In such variations, it is desired to include a solid surface layer between the lattice structure and the external environment or any external surfaces within the compressor component. Following additive manufacturing, powder may be removed and then a liquid, a gas, a gel, or other substance can be introduced into the void regions of the lattice structure to further modify the final properties of the component. Such a technique may be especially useful for modifying and further improving sound reduction or thermal transfer properties by this approach (e.g., reduction in sound transmission). In certain variations, the liquid be a polymeric precursor that cures after filling the void regions to either become a hard solid or an elastic solid (rubber) or even a gel. In other variations, a solid filler material may be disposed in the void regions to provide sound or vibration dampening. The solid filler material may be powder metal, for example, the unsintered raw material that remains intact after the additive manufacturing process.

Certain non-limiting advantages of compressor components incorporating cellular or lattice regions is that they can be designed to have a high strength accompanied by a relatively low mass. Therefore, such a lattice structure region is light-weight and provides enhanced structural or compliance performance as compared to conventional bulk materials. Furthermore, when the compressor component is formed by additive manufacturing the component may be an integrally formed, single piece, unitary monolithic structure. Additive manufacturing processes permit not only formation of lattice structures, but also provide a high degree of control over localized stiffness and deflection levels within the component formed from additive manufacturing. For example, deflection levels can be minimized while optimizing weight of the component. Modulus modification can be achieved globally for a compressor component or locally. Local variations in the lattice work can be used to modify properties in different regions of the compressor component. Additive manufacturing also enables formation of highly complex near-net shapes.

In fabricating the compressor components via additive manufacturing processes, one or more of the following additional advantages may be realized: the component has advantageously high strength to weight ratios as compared to the same component formed via conventional formation processes (e.g., casting, forging, sintering, and the like); high levels of control of stiffness and/or deflection levels within the component, including an ability to customize the stiffness and/or deflection levels within different localized regions of the component; where the component would otherwise be an assembly of parts, it does not have to be mechanically fastened (e.g., bolted, screwed) or welded, bonded or otherwise fused at joints and seams; and the component itself may have a reduced cost of manufacturing, both from using potentially less expensive raw materials and also by reducing or eliminating various manufacturing and assembling steps, thus reducing attendant labor costs. This is especially true with forming compressor components having complex structures that typically require more expensive processing techniques that have many more processing and assembly steps.

By "high-strength," in certain variations, it is meant that the component exhibits a tensile strength of greater than or equal to about 32,000 psi (about 220 MPa) in the direction that force is predominantly applied to the component, optionally greater than or equal to about 65,000 psi (about 448 MPa), in certain aspects, optionally greater than or equal to about 125,000 psi (about 861 MPa), and in certain other aspects, optionally greater than or equal to about 250,000 psi (about 1,723 MPa).

The light-weight high-strength compressor components according to certain aspects of the present disclosure can be incorporated into any one of a number of multiple different types of compressors, including scroll, rotary vane element, centrifugal, single screw, twin screw, reciprocating, linear, and the like. In certain preferred aspects, the compressor components having lattice structures in accordance with the present disclosure are particularly suitable for use in conjunction with a scroll compressor.

Figure 6:
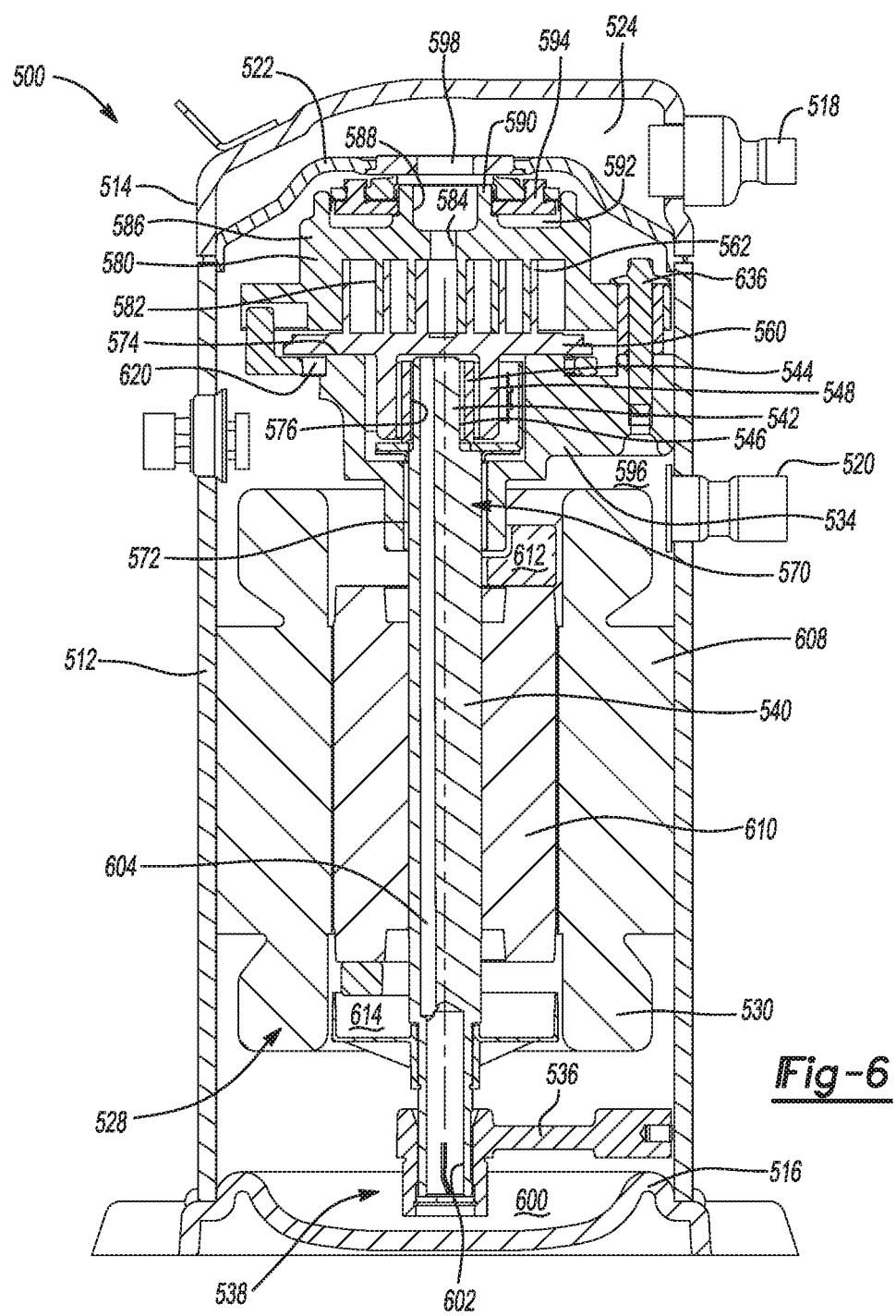
FIG. 6 is a sectional view through a center of a scroll compressor having a conventional design.

As further reference, the drawings and in particular FIG. 6, show an exemplary conventional refrigerant scroll compressor 500 that includes a generally cylindrical hermetic shell 512 having a cap 514 welded at the upper end thereof and a lower cover 516 welded to a lower end thereof. Cap 514 is provided with a refrigerant discharge 518, which may have the usual discharge valve therein. Other major elements affixed to the shell 512 include a compressor inlet 520; a transversely extending partition 522 which is welded about its periphery at the same point that cap 514 is welded to shell 512. A discharge chamber 524 is defined by cap 514 and partition 522.

A motor 528 including a motor stator 530 is disposed between the main bearing housing 534 and lower bearing support 536. A drive or crankshaft 540 has an eccentric crank pin 542 at the upper end thereof and is rotatably journaled in an upper bearing 544. The upper bearing 544 can include a conventional drive bushing 546 adjacent to (e.g., press-fitted therein). Thus, a cylindrical hub 548 of an orbiting scroll 560 receives the eccentric crank pin 542 and the upper bearing 544. The crankshaft 540 is also supported by and rotatably journaled in a lower bearing assembly 538 attached to the lower bearing support 536. In a central region of the scroll compressor 500, the crankshaft 540 passes through and rotates within an aperture 570 of main bearing housing 534, which may include a cylindrical main bearing member 572 disposed within aperture 570.

A main bearing housing 534 and lower bearing support 536 each define radially outwardly extending legs, which are each secured to the shell 512. The upper surface of the main bearing housing 534 is provided with a flat thrust bearing surface 574 on which is disposed the orbiting scroll 560 having a spiral wrap or vane 562 extending therefrom. Projecting downwardly from the lower surface of orbiting scroll 560 is the cylindrical hub 548. The upper bearing 544 is a self-lubricating sleeve type bearing that receives the drive bushing 546 therein. The cylindrical hub 548, upper bearing 544 and drive bushing 546 each define and create a concentric inner bore 576, in which crank pin 542 of crankshaft 540 is drivingly disposed. Notably, a portion of the bore 576 defines a drive flat surface (not shown) that can receive the crank pin 542, which itself has a flat surface that drivingly engages the drive flat surface formed in a portion of bore 576 to provide a radially compliant driving arrangement, such as shown in assignee's U.S. Pat. No. 4,877,382, the disclosure of which is hereby incorporated herein by reference.

Non-orbiting scroll 580 is provided having a spiral wrap or vane 582 positioned in meshing engagement with the orbiting spiral vane 562 of orbiting scroll 560. Non-orbiting scroll 580 has a centrally disposed discharge passage 584 defined by a base plate portion 586 communicating with an upward opening 588 which is in fluid communication with the muffler discharge chamber 524 defined by cap 514 and partition 522. Non-orbiting scroll 580 also includes an annular hub or raised shoulder portion 590 which surrounds the discharge passage 584. An annular recess 592 is also formed in non-orbiting scroll 580 within which is disposed a floating seal assembly 594.

An intake compartment 596 is in fluid communication with compressor inlet 520 through which the fluids (e.g., refrigerant) to be compressed within the intermeshed spiral vanes 562, 582 (for compression) are introduced. After the fluid passes through intake compartment 596, it is compressed in the spiral vanes 562, 582 so that the pressurized fluid is then released through the discharge passage 584. A reed valve assembly or other known valve assembly (not shown) may be provided in the discharge passage 584 to regulate flow from the discharge passage 584 through an opening 598 in muffler partition 522 and into discharge chamber 524.

The floating seal assembly 594 is supported by the annular recess 592 of non-orbiting scroll 580 and engages a seat of the partition 522 for sealingly dividing intake compartment 596 from discharge chamber 524. Recess 592 and floating seal assembly 594 cooperate to define an axial pressure biasing chamber which receives pressurized fluid being compressed by spiral vanes 562, 582 so as to exert an axial biasing force on non-orbiting scroll 580 to thereby urge the tips of respective spiral vanes 562, 582 into sealing engagement with the opposed baseplate surfaces.

The lower portion of the interior of shell 512 defines an oil sump 600 which is filled with lubricating oil. First bore 602 acts as a pump to force lubricating fluid up the crankshaft 540 and into second bore 604 and ultimately to all of the various portions of the compressor which require lubrication. Crankshaft 540 is rotatably driven by electric motor 528 including motor stator 530, windings 608 passing there through, and a motor rotor 610 press fitted on crankshaft 540 and having upper and lower counterweights 612 and 614, respectively.

An Oldham coupling 620 is disposed between orbiting scroll 560 and main bearing housing 534. The Oldham coupling 620 is keyed to orbiting scroll 560 and non-orbiting scroll 580 and thus prevents rotational movement of orbiting scroll 560. Oldham coupling 620 can be of the type of design disclosed in U.S. Pat. No. 5,320,506, the disclosure of which is hereby incorporated herein by reference.

Figure 7:
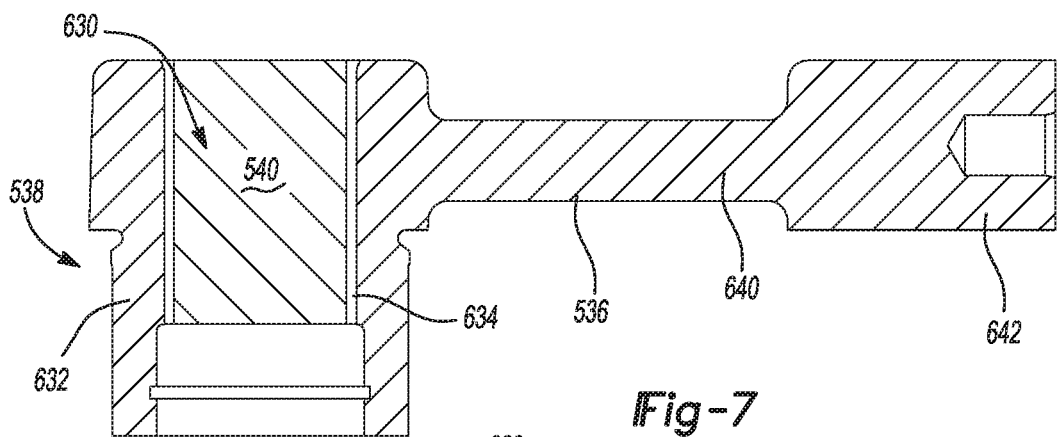
FIG. 7 is a sectional view of a lower bearing housing assembly formed of a solid structure made via conventional manufacturing techniques.

As illustrated in FIG. 7, a conventional lower bearing housing assembly 538 includes a cylindrical opening 630 extending therethrough that allows crankshaft 540 (FIG. 6) to be seated or mounted within a lower bearing support 632. A cylindrical lower bearing surface 634 is formed in lower bearing support 632 and is disposed directly against the crankshaft 540. In certain alternative variations, a separate self-lubricating cylindrical sleeve bearing may be seated or mounted in the lower bearing support 632. The lower bearing support 536 is attached to the lower bearing assembly 538 and includes a support arm 640 and a connecting portion 642 that can be attached to the shell 512 (as shown in FIG. 6). Crankshaft 540 has at the lower end the relatively large diameter concentric bore 602 which communicates with the radially outwardly smaller diameter bore 604 extending upwardly therefrom from the top of crankshaft 540.

In accordance with various aspects of the present disclosure, the light-weight high-strength compressor components have a body portion having at least one interior region comprising a lattice structure formed via additive manufacturing. As noted above, each compressor component has multiple stiffness and deflection requirements based on where and how it is used within the compressor accounting for factors such as compressor capacity and operating conditions. Thus, forming a component by additive manufacturing provides the ability to minimize weight of the component while retaining high strength levels, while also customizing deflection or stiffness levels within the component. As noted above, changes in the lattice structure within the interior region of the body of the component can change strength and stiffness levels. For example, as previously described above in FIGS. 4A-4D and 5, changing the density of the lattice structure from a first density to a second density can increase or decrease the stiffness and/or strength of the part in localized regions. For example, increasing lattice density increases weight, but also increases strength and stiffness, thus reducing deflection levels. Decreasing lattice density reduces weight, but also reduces strength and stiffness, thus increasing deflection levels. Notably, very high stiffness and low deflection levels can also be achieved by omitting the lattice structure and forming a porous solid or non-porous solid structure in certain regions of the component during the additive manufacturing process.

For purposes of illustration and by way of non-limiting example, the following principles can be used to select and design relative stiffness or deflection levels within a compressor component formed via additive manufacturing. Stiffness (k) (N/m or lb/in) is a general term which may be applied to a structure. When a force is applied to a structure, there is a displacement in the direction of the force. Stiffness (k) is a ratio of the applied force divided by an amount of displacement. Deflection ($\delta$) (mm or in) is the degree to which a structural element is displaced under a load. It may refer to an angle or a distance. High stiffness means that a large force applied only produces a small displacement. Low stiffness means that a small force applied produces a large displacement. Thus, the stiffness of a structure or component under load is directly related to the displacement of the structure under the same load. The stiffness of a compressor component depends upon material properties that form it, the shape of the component's geometry, and the load which is applied to the component structure under compressor operating conditions. In certain aspects, a single component may have multiple stiffness and/or deflection levels in different regions of the part.

Given that conventional compressor components are typically manufactured by a subtractive process, the shapes which can be produced with such processes generate structures that may have higher stiffness than what is required in a given application. This added superfluous stiffness can thus result in added material, which can add cost to the part or generate a part that is heavier than needed to survive its application. The following example refers to FIGS. 8A-8B and will show how three beams can be designed to have similar deflection levels, while allowing a reduction in weight. This same principal can be applied to compressor components, particularly components made with additive manufacturing in accordance with certain principles of the present disclosure.

In FIG. 8A, a solid beam 622 is cantilevered and fixed to a stationary point at one end 623. Solid beam 622 is assumed to be formed of steel and have a weight of about 0.035 pounds and a length (L) of 2 inches. The steel has a modulus of elasticity of about $30 \times 10^6$. The solid beam 622 has a 0.25 inch by 0.25 inch cross section. A force of 10 pounds is applied to the free end of the beam.

A second beam 624 has a hollow core and is cantilevered and fixed to a stationary point at one end 625. Second beam 624 is formed of steel and has a weight of about 0.027 pounds and a length (L) of 2 inches. The steel has the same modulus of elasticity of about $30 \times 10^6$ as solid beam 622. The cross-sectional outer dimensions of the second beam 624 are 0.25 inches by 0.25 inches. The hollow core cross-sectional dimensions are 0.12×0.12 inches. A force of 10 pounds is applied to the free end of the second beam 624.

A third beam 626 has a dual chamber hollow core (simulating a simple cellular lattice structure) and is cantilevered and fixed to a stationary point at one end 627. Third beam 626 is formed of steel and has a weight of about 0.03 pounds and a length (L) of 2 inches. The steel has the same modulus of elasticity of about $30 \times 10^6$ as solid beam 622. The cross-sectional outer dimensions of the third beam 626 are 0.25 inches by 0.25 inches. The hollow dual chamber cores each have a cross-sectional dimension of about 0.042× 0.105 inches. A force of 10 pounds is applied to the free end of the third beam 626.

FIG. 8B shows the amount of displacement (Δ) that occurs by the force or load (P) applied to the free end of each beam and provides equations for calculating displacement and maximum stress (σ). The maximum stress at the outer region of the beam is a. Z is the section modulus, E is the flexural modulus and I is the moment of inertia about the bending axis. The first solid beam 622 has a calculated deflection of 0.00273 inches, the second beam 624 has a calculated deflection of 0.00288 inches, and the third beam 626 has a calculated deflection of 0.00280 inches.

In comparing the first solid beam 622 to the second beam 624, a difference in deflection from baseline (first solid beam 622) to the second beam 624 is 0.00015, meaning an increase in deflection of about 5% and an increase in stress is about 8% for the second beam 624 as compared to the first solid beam 622. A reduction in weight from the first solid beam to the second beam 624 is about 23%. Thus, deflection and stresses increase for a beam component having a hollow core, while the weight is reduced.

In comparing the first solid beam 622 to the third beam 626, a difference in deflection from baseline (first solid beam 622) to the third beam 626 is 0.00007, meaning an increase in deflection of about 3% and an increase in stress is about 5% for the third beam 626 as compared to the first solid beam 622. A reduction in weight from the first solid beam to the third beam 626 is about 14%. Thus, deflection and stresses increase for a beam component having a dual chamber hollow core, but the overall increase is less for deflection and stress as compared to the increases attendant with the second beam 624 design, while the weight of the third beam 626 component is advantageously reduced albeit not as much as the weight reduction of the second beam 624. Hence, the simulated lattice core structure in the center of the beam 626 allows for additional reduction in deflection, but still affords a 14% weight reduction as compared to the first solid beam 622.

Thus, additive manufacturing enables a reduction in an overall weight of compressor components, including reducing the cross sectional areas as shown in the previous example. Reducing the cross sectional area of the components will decrease the stiffness, thereby increasing the working deflection of the components as shown in the previous example. Therefore, there is a relationship between weight reduction and the decrease in stiffness or increase in deflection as shown in the previous example.

FIG. 9 shows an exemplary chart of deflection versus stiffness for certain select representative scroll compressor components to demonstrate the relationship of deflection versus stiffness requirements for a compressor component. This chart shows pictorially where different scroll compressor components fall in relationship to their stiffness requirements based on localized use requirements within the compressor. A representative curve for an average deflection versus stiffness is shown. A first envelope 1100 is shown on the chart, which generally applies to scroll components (having involutes or vanes, base plates, and a hub) used within a scroll compressor. The first envelope 1100 requires components to have the highest stiffness levels and the lowest deflection levels. A second envelope 1110 permits somewhat lower stiffness levels than the first envelope 1100, although the stiffness required is still high. The second envelope 1110 also permits somewhat greater deflection levels. The second envelope 1110 generally applies to Oldham coupling rings.

A third envelope 1120 has relatively lower stiffness levels and higher deflection levels than the second envelope 1110. Main bearing housings and lower bearing housing components are considered to fall with the third envelope 1120 of deflection versus stiffness requirements. A fourth envelope 1130 has the lowest stiffness and the greatest deflection levels. Components such as housing, shell, top caps, muffler plates, divider plates, and compressor lower covers are all considered to fall within such stiffness and deflection performance requirements.

Thus, depending on how much of a deflection increase (stiffness decrease) is acceptable for a given component or feature, an amount of weight savings in the component design can be calculated accordingly. By way of non-limiting example, FIGS. 10-12 show calculations of deflection versus weight for simple representative shapes. FIG. 10 shows an increase in deflection versus weight reduction for a square shape. The weight reduction is calculated from a solid square beam to a hollow square beam. FIG. 10 predicts a permissible weight reduction of a square shape based on increase in deflection. For example, if the feature or component can accommodate a 20% increase in deflection, a 40% weight reduction can be achieved.

FIG. 11 shows an increase in deflection versus weight reduction for a circular or round shape. The weight reduction is calculated from a solid round beam to a hollow round beam. Like the square shape in FIG. 10, FIG. 11 predicts that if the round-shaped feature or component can accommodate a 20% increase in deflection, a 40% weight reduction could be achieved.

FIG. 12 shows a similar chart to FIGS. 10 and 11 of deflection versus weight reduction, but includes various rectangular elongated beam shapes with different cross-sectional dimensions indicated (length remains the same). The cross-sectional dimensions of the examples include 2 inches×0.5 inches, 3 inches×1 inch, 4 inches×2 inches, 0.5 inches×2 inches, 1 inch×3 inches, and 2 inches×4 inches. The weight reduction is calculated from a solid rectangular beam to a hollow rectangular beam. FIG. 12 predicts a weight reduction for rectangular beams based on deflection. For example, if the component has a rectangular beam shape with cross-sectional dimension of 2 inches×4 inches, where a 20% increase in deflection can be accommodated, a weight reduction of a little over 30% can be realized. Thus, a comparison of deflection versus weight reduction can be made for each of the components. Hence, a weight savings can be calculated based on stiffness/deflection levels. While the concept is applied to simple shapes in FIGS. 10-12 for purposes of illustration, such principles are equally applicable to more complex shapes and can be used to design and preselect the amount of deflection/stiffness required for a compressor part, while achieving a substantial weight loss for components formed via additive manufacturing comprising lattice structures (as compared to compressor parts formed from conventional techniques). Thus, additive manufacturing of compressor components to incorporate lattice core structures can provide control over deflection levels, while optimizing weight.

However, additive manufacturing of compressor components realizes other benefits attendant with controlling deflection in compressor components using a lattice core structure. For example, stiffness or deflection can be controlled locally to different levels within a single compressor component. Thus, a body portion of the compressor component comprising a lattice structure may have a first region having a first deflection level and a second region having a second deflection level distinct from the first deflection level. Likewise, the body portion of the light-weight high-strength compressor component optionally comprises a first region having a first stiffness and a second region having a second stiffness distinct from the first stiffness. As noted above, stiffness and deflection levels are related to one another.

Generally, each compressor component has multiple stiffness and deflection requirements based on how it is used within the compressor. Thus, forming a component by additive manufacturing provides the ability to minimize weight of the component while retaining high strength levels, while also customizing deflection or stiffness levels within the component. As noted above, changes in the lattice structure within the interior region of the body of the component can change strength and stiffness levels. For example, as previously described above in FIGS. 4A-4D and 5, changing the density of the lattice structure from a first density to a second density can increase or decrease the stiffness and/or strength of the part in localized regions. For example, increasing lattice density increases weight, but also increases strength and stiffness, thus reducing deflection levels. Decreasing lattice density reduces weight, but also reduces strength and stiffness, thus increasing deflection levels. Notably, very high stiffness and low deflection levels can also be achieved by omitting the lattice structure and forming a porous solid or non-porous solid structure in certain regions of the component during the additive manufacturing process. As noted above, the stiffness, deflection, and strength of a component may be controlled globally for a given compressor component or alternatively locally.

Such localized control over deflection/stiffness is particularly useful in the certain scroll compressor components discussed further herein. However, these are only representative applications and it should be understood that there may be other areas of applicability in various compressor components and designs. In certain variations, components incorporating bearing regions can have a body portion designed to have a first region with a first deflection level and/or stiffness and a second region having a second deflection level and/or stiffness distinct from the first deflection level and/or stiffness. By way of example, lower bearing assemblies or main bearing housing can be designed and additive manufactured with such principles in mind. The flexibility in selecting different stiffness and/or deflection levels allows the component to have bearings capable of conforming to the counter surface (e.g., a shaft or a scroll in a scroll compressor) to provide enhanced reliability and lower power consumption.

In accordance with certain aspects of the present disclosure, the light-weight high-strength compressor component in FIG. 13 is a lower bearing assembly 650, which can be compared to the conventional lower bearing assembly 630 shown in FIG. 7. The lower bearing assembly 650 has a body portion 652 with one or more interior regions 658 that have an internal lattice structure 660, such as any of the embodiments described. Such a component may be formed by any of the additive manufacturing techniques described above. The body portion 652 is designed to have a first region 654 with a first deflection level and/or stiffness and a second region 656 having a second deflection level and/or stiffness distinct from the first deflection level and/or stiffness.

The lattice structure 660 is formed internally and thus covered by a metal surface 662. As shown, the lower bearing component 650 includes a cylindrical region 666 that has a cylindrical opening 667 extending there through that allows the crankshaft 540 to be seated or mounted within the cylindrical region 666. As shown by deflection line 672, the crankshaft 540 deflects due to bearing, motor and centrifugal loads applied thereto during compressor operation.

The lower bearing support 664 defines a support arm 668 and a connecting portion 669. As shown, the internal lattice structure 660 is formed in the internal body portion of the cylindrical region 666 and internal region of the lower bearing support 664. Thus, the locations within the component 650 that have internal lattice structure 660 generally correspond to the first region 654 having the first stiffness and/or deflection level. The second region 656 corresponds to locations of the lower bearing assembly component 650 that are formed of a solid material.

In this manner, the core regions having the internal lattice structure 660 formed from an additive manufacturing process may be light-weight, high-strength, and further desirably have locally distinct and customized stiffness or deflection levels in certain variations. It should be noted that the density of the internal lattice structures 660 can also be varied to modify stiffness and/or deflection levels. This allows the lower bearing assembly 650 to have high levels of stiffness and low deflection in areas where the lower bearing assembly 650 is staked (e.g., in second region 656 where the lower bearing assembly 650 is staked to a housing or other stationary component) or in regions that receive axial loads, but flexible in the bearing areas (generally corresponding to the first region 654) to conform to crankshaft 540 deflections (illustrated by deflection line 672) to improve alignment robustness and bearing performance. The flexibility in the first region 654 allows the bearing(s) to conform to the opposing shaft or scroll for enhanced reliability and lower power consumption. As will be discussed further below, the opposing counter surfaces are themselves often under pressure and may experience high levels of deflection, so the ability to have greater deflection and less stiffness in the complementary bearing can reduce edge loading wear and prolong lifespan with enhanced reliability. Such principles are applicable to any of the compressor components discussed herein.

During the additive manufacturing process, residual powder may remain after energy is applied (e.g., laser that sinters or fuses the solid particles) to form the contiguous solid structures that create the part (including the lattice structure(s)). In certain variations, the residual powders, such as metal powders, may remain inside the lattice structure voids to provide additional insulating properties. Alternatively, the residual powders may be removed via one or more removal holes 670. These removal holes 670 can be located anywhere on the component 650. Notably, in variations where the excess residual powder is not removed, such removal holes 670 may be omitted. Removal of any remaining powder in the porous material is preferred; although separate removal holes open to the exterior of the bearing component 650 are not necessary.

In certain variations, a further manufacturing step may close the removal holes, for example, where the voids defined in the lattice structures are to have a negative pressure or vacuum, or the materials forming the internal core regions are not compatible with materials in the compressor environment (e.g., not compatible with refrigerants and lubricant oils circulating within the compressor or in the porous material). The hole may or may not need to be sealed in the final part, but if so, methods such as soldering, welding, adhesives, and the like may be used. In certain aspects, the lower bearing compressor component may have one or more void regions of the lattice structure filled with an insulating material (or a negative pressure or vacuum) that may minimize transmission of at least one of thermal energy, sounds, or vibration. By using a lower bearing housing having such lattice structures and porous regions as described in FIG. 13, in certain aspects, the component is a high-strength, low weight part that serves to reduce wear and thus efficiency and lifetime of the compressor in which it is incorporated.

In another variation in accordance with certain aspects of the present disclosure, a light-weight high-strength insulating compressor component may be a main bearing housing 700 like that in FIG. 14A. The main bearing housing component 700 defines a body portion 710 of the structure. The body portion 710 may include an upper cylindrical support region 720 and a lower cylindrical support region 722 that together define an opening 724. The opening 724 may receive the cylindrical hub 548 of orbiting scroll and the eccentric crank pin 542 of crankshaft 540 journaled in upper bearing 544. As shown by deflection line 760, the crankshaft 540 deflects due to bearing, motor and centrifugal loads applied thereto during compressor operation.

The main bearing component 700 also includes an outwardly extending leg 726 that includes a bore 728 that receives a fastener (not shown in FIG. 14A, but 636 in FIG. 6) on a terminal end 730 of the body portion 710. Terminal end 730 attaches the main bearing housing component 700 to the shell or housing. The main bearing housing component 700 also defines an upper thrust surface 732.

The body portion 710 of main bearing housing component 700 has one or more interior regions 740 that have an internal lattice structure 742, such as any of those described above. The body portion 710 is designed to have a first region 712 with a first deflection level and/or stiffness and a second region 714 having a second deflection level and/or stiffness distinct from the first deflection level and/or stiffness. It should be noted that the main bearing housing component 700 is not limited to only two distinct stiffness or deflection levels.

The lattice structure 742 is formed internally within the body portion 710 and thus covered by a metal surface 744. As shown, the internal lattice structure 742 is formed in the internal body portion 710, including in the upper cylindrical support region 720 and lower cylindrical support region 722, along with portions of the outwardly extending leg 726. Such a component 700 may be formed by any of the additive manufacturing techniques described above. Thus, the locations within the component 700 that have internal lattice structure 742 generally correspond to the first region 712 having the first stiffness and/or deflection level. The density of the internal lattice structure 742 can also be varied to modify stiffness and/or deflection levels. The second region 714 corresponds to locations of the main bearing housing component 700 that are formed of a solid material. The main bearing housing 700 needs to be stiff for staking and withstanding scroll loads from the compression mechanism, but also needs to be flexible in the main bearing region (especially in the lower cylindrical support region 722) to conform to crankshaft 540 deflections as indicated along deflection line 760. In certain variations, the upper thrust surface 732 may also be designed to have a preselected deflection level/stiffness to deform with the baseplate of the adjacent orbiting scroll when applied pressure from the compression mechanism causes distortion and bending of the baseplate. By designing the upper thrust surface 732 to have greater deflection ability, better loading can be achieved.

The lattice structure 742 may have materials (e.g., loose particles) disposed within void regions or removed via removal holes in the main bearing housing component 700 (not shown). The core regions of the body portion 710 having the internal lattice structure 742 formed from an additive manufacturing process may be light-weight, high-strength, and further desirably have locally distinct and customized stiffness or deflection levels.

In an embodiment like that shown in FIG. 14A, the internal lattice structures 742 provide locally distinct and customized stiffness or deflection levels. Further, the lattice structures 742 may also provide insulating characteristics to the main bearing housing component 700 and thus are capable of minimizing transmission of sound and vibration through the main bearing housing 700. The main bearing housing prepared in accordance with the present disclosure also has reduced mass as compared to a solid main bearing housing. As noted above, local lattice cell density modifications can be made in certain embodiments to increase or decrease the housing stiffness and/or deflection and potentially to further improve sound and/or vibration insulating characteristics.

This allows the main bearing housing 700 to have high levels of stiffness and low deflection in areas where the main bearing housing 700 is staked (e.g., in second region 714 where the main bearing housing 700 is staked to a housing or other stationary component) and flexible in the bearing areas (corresponding to the first region 712) to improve alignment robustness and bearing performance. The flexibility in the first region 712 allows the bearing(s) to conform to the opposing shaft or scroll for enhanced reliability and lower power consumption. This can serve to improve alignment robustness and bearing performance. As will be discussed further below, the opposing counter surfaces are themselves often under pressure and may experience high levels of deflection, so the ability to have greater deflection and less stiffness in the complementary bearing can reduce edge loading wear and prolong lifespan with enhanced reliability. Notably, even within the first region 712, there may be several distinct levels of stiffness or deflection, for example, the upper cylindrical support region 720 may have different stiffness/deflection requirements than the lower cylindrical support region 722. In this manner, the core regions having the internal lattice structure 742 formed from an additive manufacturing process may be light-weight, high-strength, and further desirably have locally distinct and customized stiffness or deflection levels. Such principles are applicable to any of the compressor components discussed herein.

FIG. 14B is a magnified view of the region shown in FIG. 14A and shows one exemplary variation of a lattice structure 742 that can be used in a compressor component, such as a main bearing housing 700. The lattice structure 742 is particularly suitable for sound dampening and vibration insulation applications. Such a non-limiting design may apply to other compressor components discussed herein. In FIG. 14B, a portion of the exemplary lattice structure 742 is shown. The lattice structure 742 includes a plurality of nodes 750 that are solid structures. The nodes 750 have a spherical or round shape, but any of the previous node shapes are also contemplated, including hollow shapes. In certain variations, the plurality of nodes 750 may include multiple distinct nodes that are arranged in alternating patterns. As shown in this lattice structure 742, the nodes 750 are in contact with one another or alternatively may have connecting structures between them.

FIG. 15 shows a detailed sectional view of a conventional crankshaft 540 like that in FIG. 6. The eccentric crank pin 542 at the upper end thereof is rotatably journaled in the upper bearing 544. The upper bearing 544 can include a conventional drive bushing 546 adjacent to (e.g., press-fitted therein). Thus, the cylindrical hub 548 (attached to the orbiting scroll 560 not shown in FIG. 15) receives the eccentric crank pin 542 and the upper bearing 544. The cylindrical hub 548, upper bearing 544 and drive bushing 546 each define and create the concentric inner bore 576, in which crank pin 542 of crankshaft 540 is drivingly disposed. The crankshaft 540 is also supported by and rotatably journaled in a lower bearing assembly 538 attached to the lower bearing support 536. In a central region of the scroll compressor 500, the crankshaft 540 passes through and rotates within the aperture 570 of main bearing housing 534, which may include a cylindrical main bearing member 572 disposed within aperture 570.

Crankshaft 540 is rotatably driven by electric motor (shown as electric motor 528 including motor stator 530 in FIG. 6). The motor rotor 610 is press fitted on crankshaft 540 and has upper and lower counterweights 612 and 614, respectively. The crankshaft 540 is rotatably driven by the rotor 610 interacting with the stator of the electric motor. The torque produced by the motor is transferred to the crankshaft 540 to overcome the forces produced during the compression process occurring between the orbiting and non-orbiting scroll members. These forces along with motor forces are what generate the loads in the bearings and produce deflection in the crankshaft 540 shown by representative deflection line 564. The deflection will change depending on what condition the compressor is operating at. Maximum load will create maximum deflection. This deflection tends to edge load the upper and lower bearings. For example, 566A shows regions between the crankshaft 540 and lower bearing assembly 538 where bearing edge loading occurs due to the deflection of the crankshaft 540. Regions 566B show bearing edge loads occurring near the main bearing 534 due to crankshaft 540 deflection during compressor operation. Regions 566C correspond to regions of edge loading due to forces exerted by the compression process and crankshaft 540/crankpin 542 deflection. This edge loading diminishes the load carrying ability of the bearings, causing high power consumption and reduced compressor life.

FIG. 16 shows a light-weight high-strength scroll compressor component in the form of a crankshaft 1000 prepared in accordance with certain aspects of the present disclosure. The crankshaft 1000 has a crankpin 1002 on one end and a terminal end 1004 at an opposite end. The crankshaft 1000 is rotatably driven by rotor 610 of electric motor (not shown) like the crankshaft 540 in FIG. 15. Elements that are common to the scroll compressor 500 described in the context of FIGS. 6 and 15 are used herein for brevity. The crankpin 1002 has a flat surface 1006 that drivingly engages with an opposing drive flat surface in bore 576 within the cylindrical hub 548 of orbiting scroll member. The terminal end 1004 can seat within a lower bearing assembly 538. A first open channel or bore 1010 is formed within the crankshaft 1000 at the terminal end 1004 and permits lubricating oil to be pumped up the crankshaft 1000 into second bore 1012. Second bore 1012 has two terminal openings 1036, thus ultimately lubricating oil is pumped through crankshaft 1000 to all of the various portions of the compressor which require lubrication. Thus, the first open bore 1010 and second bore 1012 serve as fluid delivery passages through a length of the crankshaft 1000.

A body portion 1020 of the crankshaft 1000 is disposed between the crankpin 1002 and the terminal end 1004. The body portion 1020 has at least one core or interior region 1022 comprising a lattice structure 1030, such as those discussed previously above. The lattice structure 1030 is formed internally and thus covered by a metal surface 1032. The internal second bore 1012 is separated from the lattice 1030 by an internal solid surface 1034. Such a component may be formed by any of the additive manufacturing techniques described above. Utilizing additive manufacturing and the lattice core structures, the crankshaft 1000 may be designed for enhanced deflection control. This means that the crankshaft 1000 deflection levels can be designed to match the deflections in the upper and lower bearing contact regions (edge loading regions discussed in the context of FIG. 15). Better matching of the deflections allows better load carrying ability of the bearings, resulting in lower power consumption along with enhanced compressor reliability and longevity.

Thus, in a first region 1050, the crankshaft 1000 is designed to have a first stiffness or deflection level. In a second region 1052, the crankshaft 1000 is designed to have a second stiffness or deflection level that is different from that in the first region 1050. As shown in FIG. 16, the first region 1050 has a greater stiffness or reduced deflection level as compared to the second region 1052. The enhanced stiffness/diminished deflection in the first region 1050 thus helps to minimize edge loading at the lower bearing of the lower bearing assembly 538. Greater deflection/diminished stiffness in the central region of the crankshaft 1000 corresponding to the second region 1052 is permissible and permits realization of weight reduction by employing the open reduced volume lattice structure 1030. A third region 1054 has a third stiffness or deflection level that is different from that in the second region 1052 (and optionally the first region 1050). A greater stiffness/diminished deflection in the third region 1054 as compared to the second region 1052 helps to minimize edge loading at the main bearing 572. The crankshaft 1000 further transitions into a fourth region 1056 having a fourth stiffness or deflection level. Like the first region 1050, a greater stiffness/diminished deflection in the fourth region 1056 thus helps to minimize edge loading at the upper bearing 544. It should be noted that while each of first region 1050, second region 1052, third region 1054, and fourth region 1056 may have distinct stiffness and/or deflection levels by way of non-limiting example, some of these stiffness levels or deflection levels may also be the same. Additive manufacturing techniques enable control over localized stiffness/deflection within different portions or regions of the component, as desired. Furthermore, additive manufacturing permits formation of thicker walls for additional reinforcement as needed in certain portions of the crankshaft 1000, if needed. The thicker and thinner structures can be printed via the additive manufacturing in the areas where required.

During the additive manufacturing process, residual powder may remain after energy is applied (e.g., laser that sinters or fuses the solid particles) to form the contiguous solid structures that create the part (including the lattice structure(s)). In certain variations, the residual powders, such as metal powders, may remain inside the lattice structure voids to provide additional insulating properties. As shown in FIG. 16, there are no removal holes in the solid surface 1032 for removing residual or loose powder from the additive manufacturing process. Thus, a plurality of loose particles may be left within the void regions of the lattice structure 1030. This may provide thermal, sound or vibration dampening properties to the crankshaft 1000. Alternatively, the residual powders may be removed via one or more removal holes. These removal holes can be located anywhere on the crankshaft component 1000 within the solid surface 1032. Notably, in variations where the excess residual powder is not removed, such removal holes may be omitted. In certain variations, a further manufacturing step may close the removal holes, for example, where the voids defined in the lattice structures are to have a negative pressure or vacuum, or the materials forming the internal core regions are not compatible with materials in the compressor environment (e.g., not compatible with refrigerants and lubricant oils circulating within the compressor or in the porous material). The hole may or may not need to be sealed in the final part, but if so, methods such as soldering, welding, adhesives, and the like may be used.

In certain aspects, the crankshaft compressor component may have one or more void regions of the lattice structure filled with an insulating material (or a negative pressure or vacuum) that may minimize transmission of at least one of thermal energy, sounds, or vibration or may provide additional stiffness where needed. By using a crankshaft having such lattice structures, in certain aspects, the component is a high-strength, low weight part that serves to increase efficiency and lifetime of the compressor in which it is incorporated.

In other variations, a light-weight high-strength insulating compressor component may be an orbiting scroll member or a non-orbiting scroll member like those shown in FIG. 17. For purposes of illustration, the same reference numbering is used in FIG. 17 as in FIG. 6. Significant distortion and deflection can occur in the orbiting scroll member 560 or the non-orbiting scroll member 580, especially when the compressor 500 experiences high operating pressures. The orbiting scroll member 560 has involute vanes 562 and a baseplate 770, while the non-orbiting scroll member 580 has involute vanes 582 as well as baseplate 772. As discussed above, the orbiting involute vanes 562 intermesh with the non-orbiting involute vanes 582 to create pockets as part of the compression mechanism. However, particular difficulties can arise when the refrigerant comprises carbon dioxide or other high pressure refrigerants. In certain operating regimes, carbon dioxide refrigerant may be subcritical, transcritical or may be in a supercritical state during some operating conditions (e.g., high pressure conditions), where the $CO_2$ is required to have very high pressures. The baseplate and vanes, especially the baseplate 770 and vanes 562 on the orbiting scroll member 560, can experience significant distortion and bending due to high pocket pressures in the compression mechanism, as is shown in FIG. 17 along deflection lines 774. The high pressures cause the tips of involute vanes 562, 582 to deform as well. This deformation generates gaps at the tips and bases of the scroll members, resulting in loss of efficiency. The present disclosure thus provides the ability to design and manufacture scroll components that can account for such distortion and deform by the same or similar amounts to reduce gaps at the tips and opposing bases.

A similar effect occurs in high-side scroll compressor designs. For purposes of illustration, an exemplary scroll compressor 500 is used as a non-limiting example in FIG. 18 to show the general principles of high-side pressure deflection, but high-side scroll compressor designs may vary from the exemplary compressor shown in FIG. 18. Thus, high-side compressors may have other components or designs than those shown in FIG. 18, which is merely provided to illustrate the general principles of high-side deflection. Orbiting scroll member 560 has involute vanes 562 and a baseplate 770, while the non-orbiting scroll member 580 has involute vanes 582 as well as baseplate 772. A high-side pressure design includes a high-side pressure region 776 and an intermediate pressure axial balancing region 778 located inside the main bearing housing and a low side inlet 780 in the non-orbiting scroll. In hermetically or semi-hermetically sealed motor compressors, the refrigerant gas, which enters the scroll as vapor on the low-side inlet, passes into and is processed within the compression mechanism. As discussed above, the orbiting involute vanes 562 intermesh with the non-orbiting involute vanes 582 to create pockets as part of the compression mechanism. In the compression mechanism, the refrigerant gas forms a compressed, pressurized refrigerant gas that passes through a high-side discharge passage 584 in the non-orbiting scroll member 580. The processed discharge gas thus has significantly higher temperatures and pressures than the pre-processed suction refrigerant. High discharge pressures in the high-side pressure region 776 act on the fixed or non-orbiting scroll 580 causing high distortions and bending in the baseplate 772 of the non-orbiting scroll, as is shown in FIG. 18 along deflection lines 782. The high pressures cause the tips of involute vanes 562, 582 to deform as well. This deformation generates gaps at the tips and bases 770, 772 of the scroll members 560, 580. Additive manufacturing provides the ability to design the scroll members 560, 580 to deform the same amount to reduce gaps at the tips and baseplates of the intermeshed scroll members, as will be discussed further herein in the context of FIGS. 19A-20B.

In certain embodiments of the present disclosure, a high-strength, light-weight compressor component may be an orbiting scroll component 850 as in FIG. 19A providing the ability to control deflection levels and stiffness within the scroll member. The orbiting scroll 850 includes a baseplate 860 having a first side 862 and a second side 864. Vanes 866 define an involute scroll form that extends from the first side 862 of baseplate 860. A cylindrical hub 868 extends downwardly from the second side 864 of baseplate 860. A pair of outwardly projecting flange portions 870 each of which is provided with an outwardly opening slot (not shown, but which receive a pair of Oldham keys from the Oldham coupling). A body portion 872 of the orbiting scroll component 850 has at least one core or interior region 874 comprising a lattice structure 880 formed via additive manufacturing. A solid surface 882 is disposed over the lattice structure 880. The lattice structure 880 may be disposed in an interior region 872 of one or more of the baseplate 860, the cylindrical hub 868, and/or the vanes 866 of the involute scroll form.

As shown in FIG. 19A, the lattice structure is formed as a continuous region within each of the baseplate 860, the cylindrical hub 868, and/or the vanes 866 of the involute scroll form. However, as with any of the other components described herein, discrete compartments or internal regions that are sealed or separated from one another may be formed with different lattice structures or different materials, depending upon mechanical properties required. Furthermore, as noted above, local lattice cell density modifications can be made in certain embodiments to increase or decrease the stiffness and/or deflection.

By way of example, only one of the baseplate 860, cylindrical hub 868, or vanes 866 may include the lattice structure 880 (or some combination thereof), in alternative variations, while other regions may be porous solid or non-porous solid created via additive manufacturing. Also each distinct region may have distinct lattice structure 880 designs. Notably, there are no removal holes formed in the solid surface 882 for removal of residual or loose powder from the additive manufacturing process. Thus, a plurality of loose particles 884 may be left within the void regions of the lattice structure 880. This may provide additional sound or vibration dampening properties to the orbiting scroll component 850. Notably, certain areas may require thicker walls (or solid surfaces 882), for example, solid surface 882 may be thicker on the second side 864 along the cylindrical hub 868 and lower regions of the baseplate 860, while solid surface 882 may be thinner along the first side 862, including along the surface regions of vanes 866. The scroll vanes 866 are designed for weight reduction with equal or better strength than conventionally formed vanes. The thicker and thinner structures can be printed via the additive manufacturing in the areas where required. Likewise, lattice structures with different densities and designs can be printed to desired predetermined stiffness and/or deflection levels.

Notably, there may be several distinct levels of stiffness or deflection incorporated into the body portion 872, for example, the baseplate 860, the vanes 866, and/or the cylindrical hub 868, may have different stiffness/deflection requirements than one another. Even within these regions, localized regions may have differing stiffness and/or deflection levels, for example, the tips of vanes 866 may be reinforced. In this manner, the core regions having the internal lattice structure 880 formed from an additive manufacturing process may be light-weight, high-strength, and further desirably have locally distinct and customized stiffness or deflection levels. The flexibility in designing components with predetermined deflection and stiffness properties to account for the deflection that can occur under certain operating conditions, like those discussed above in the context of FIGS. 17 and 18. Better matching of the deflections between opposing components and correcting for anticipated force levels allows better load carrying ability, resulting in lower power consumption and improved efficiency along with enhanced compressor reliability and longevity. Such principles are applicable to any of the compressor components discussed herein.

Another variation of a high-strength light-weight insulating orbiting scroll component 850 is shown in FIG. 19B. The design and components in orbiting scroll component 850A are the same as those in orbiting scroll component 850 in FIG. 19A, unless otherwise discussed herein. In orbiting scroll component 850A, a solid surface 882A is disposed over a lattice structure 880A. However, one or more removal holes 890 are formed in the solid surface 882A for removal of residual or loose powder remaining after the additive manufacturing process. Thus, the lattice structure 880A may have empty void regions. Notably, some loose particles may remain in the voids after the removal process; however a majority of loose and residual particles are removed. In certain aspects, the lattice structure 880A design may provide adequate properties (such as insulation to sound or vibration) so that leaving such particles or introducing another material is not necessary. In other variations, the lattice structure 880A may have empty void regions that are subsequently filled with distinct insulating materials (e.g., solids, gels, foams, liquids, or gases) or negative pressure/vacuum. After removal, the removal holes 890 in the solid surface 882A may be subsequently sealed over with a material via a variety of known techniques to create such patches. The removal holes 890 may be sealed when it is desirable to have a contained or sealed interior volume, for example, when the interior region 872 is formed of or contains a material that is not compatible with refrigerant and oils in the compressor or a vacuum is present in the voids of the lattice structure 880A. The holes 890 may or may not need to be sealed in the final part, but if so, methods such as soldering, welding, adhesives, and the like may be used.

Another variation of a high-strength light-weight insulating compressor component is non-orbiting scroll component 900 is shown in FIG. 20A. The non-orbiting scroll component 900 includes a baseplate 910 having a first side 912 and a second side 914. Vanes 916 define an involute scroll form that extends from the first side 912 of baseplate 910. Non-orbiting scroll component 900 includes an annular hub or raised shoulder portion 918 which surrounds the discharge passage 920. An annular recess 922 is also formed in non-orbiting scroll component 900 within which a floating seal assembly may be disposed (not shown). A series of outwardly projecting flange portions 924 each of which is provided with an outwardly opening slot (not shown, but which receive a pair of Oldham keys from the Oldham coupling).

A body portion 930 of the orbiting scroll component 900 has at least one core or interior region 932 comprising a lattice structure 940 formed via additive manufacturing. A solid surface 942 is disposed over the lattice structure 940. The lattice structure 940 may be disposed within an interior region 932 of one or more of the baseplate 910, raised shoulder portion 918, and/or the vanes 916 of the involute scroll form. As shown in FIG. 20A, the lattice structure 940 is formed as a continuous region within each of the baseplate 910, annular raised shoulder portion 918, and/or the vanes 916 of the involute scroll form. However, as with any of the other components described herein, discrete compartments or internal regions that are sealed or separated from one another may be formed with different lattice structures or different materials, depending upon mechanical properties required. Furthermore, as noted above, local lattice cell density modifications can be made in certain embodiments to increase or decrease the housing stiffness and/or deflection.

By way of example, only one of the baseplate 910, annular raised shoulder portion 918, or vanes 916 may include the lattice structure 940 (or some combination thereof), in alternative variations, while other regions may be porous solid or non-porous solid created via additive manufacturing. Also each distinct region may have distinct lattice structure 940 designs. Notably, there are no removal holes formed in the solid surface 942 for removal of residual or loose powder from the additive manufacturing process. Thus, a plurality of loose particles 944 may be left within the void regions of the lattice structure 940. This may provide additional sound or vibration dampening properties to the non-orbiting scroll component 900. Notably, certain areas may require thicker walls (or thicker solid surfaces 942), for example, solid surface 942 may be thicker on the second side 914 to reinforce the structure, while solid surface 942 may be thinner along the first side 912, including along the surface regions of vanes 916. The scroll vanes 916 are designed for weight reduction with equal or better strength than conventionally formed vanes. The thicker and thinner structures can be printed via the additive manufacturing in the areas where required. Likewise, lattice structures with different densities and designs can be printed to desired predetermined stiffness and/or deflection levels.

Another variation of a high-strength light-weight insulating compressor component is non-orbiting scroll component 900A is shown in FIG. 20B. The design and components in non-orbiting scroll component 900A are the same as those in non-orbiting scroll component 900 in FIG. 20A, unless otherwise discussed herein. In non-orbiting scroll component 900A, a solid surface 942A is disposed over a lattice structure 940A. However, one or more removal holes 946 are formed in the solid surface 942A for removal of residual or loose powder remaining after the additive manufacturing process. Thus, the lattice structure 940A may have empty void regions. Notably, some loose particles may remain in the voids after the removal process; however a majority of loose and residual particles are removed. In certain aspects, the lattice structure 940A design may provide adequate insulation to sound or vibration so that leaving such particles or introducing another material is not necessary. In other variations, the lattice structure 940A may have empty void regions that are subsequently filled with distinct insulating materials (e.g., solids, gels, foams, liquids, or gases) or negative pressure/vacuum. After removal, the removal holes 946 in the solid surface 942A may be subsequently sealed over with a material via a variety of known techniques to create such patches. The removal holes 946 may be sealed when it is desirable to have a contained or sealed interior volume, for example, when the interior region 932 is formed of or contains a material that is not compatible with refrigerant and oils in the compressor or a vacuum is present in the voids of the lattice structure 940A. The holes 946 may or may not need to be sealed in the final part, but if so, methods such as soldering, welding, adhesives, and the like may be used.

The principles of the present disclosure are widely applicable to a variety of different compressor components. By way of non-limiting example, in certain variations, the light-weight, high-strength compressor component is optionally selected from the group consisting of: a bearing housing, a main bearing housing, a lower bearing housing, an orbiting scroll component, a non-orbiting scroll component, a crankshaft, an Oldham coupling, a housing or a shell, a cap, a cover, a separator plate, a muffler plate, a scroll compressor valve, a drive bushing, an interface region between a shell and stator, a roller element, a rotary vane element, a roller element housing, a screw component, a screw, a gate rotor, a bearing, a centrifugal compressor component, a reciprocating component, a piston, a connecting rod, a cylinder head, a compressor body, a discus valve, a discus valve retainer, a valve plate, and combinations thereof. Such a component having an internal lattice structure when incorporated into a compressor serves to reduce weight, while controlling deflection and stiffness of the component within the compressor. Such light-weight high-strength components with controlled deflection and/or stiffness levels formed via additive manufacturing enhance compressor operation, durability, and lifespan. Thus, such a component may be incorporated into a compressor that has a higher efficiency or enhanced performance. Also, the high level of flexibility in designing local lattice density modifications makes it possible to locally increase or decrease component stiffness or deflection levels, while potentially also improving thermal, sound and/or vibration characteristics.

In certain variations, the compressor may be a scroll compressor and the compressor component may be a scroll compressor component. In certain embodiments, the light-weight, high-strength scroll compressor component is optionally selected from the group consisting of: a bearing housing, a main bearing housing, a lower bearing housing, an orbiting scroll component, a non-orbiting scroll component, a crankshaft, a housing or a shell, a cap, a cover, a separator plate, a muffler plate, an Oldham coupling ring, a scroll compressor valve, a drive bushing, an interface region between a shell and stator, and combinations thereof.

In certain other aspects, a compressor component may be an assembly formed from a first piece or part that is created via additive manufacturing having at least one interior region comprising a lattice structure. The assembly may further comprise other pieces or parts that are created via conventional formation techniques, for example, being wrought, cast, or sintered from a powdered metal in a conventional manner as recognized in the art.

Types of compressors that can incorporate components prepared in accordance with certain aspects of the present disclosure include positive displacement and dynamic compressors. Positive displacement compressors increase refrigerant vapor pressure by reducing the volume of the compression chamber through work applied to the compressor's mechanism. Positive displacement compressors include many styles of compressors currently in use, such as reciprocating, linear rotary (rolling piston, rotary vane element, single screw, twin screw, centrifugal compressor component), and orbital (scroll or trochoidal). Dynamic compressors increase refrigerant vapor pressure by continuous transfer of kinetic energy from the rotating member to the vapor, followed by conversion of this energy into a pressure rise. Centrifugal compressors function based on these principles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A light-weight high-strength compressor component for a scroll compressor for a heating or cooling system that circulates a working fluid comprising a refrigerant, comprising:
a body portion having at least one sealed interior region that comprises a metallic lattice structure comprising a plurality of cells formed via additive manufacturing and a surface layer comprising a metal disposed over and entirely enclosing the lattice structure and to seal the component from the working fluid comprising the refrigerant, wherein the body portion comprises a first region having a first stiffness and a second region having a second stiffness distinct from the first stiffness, wherein the plurality of cells comprises a first cell having a first maximum average dimension and a second cell having a second maximum dimension, wherein the first maximum average dimension and the second maximum average dimension are distinct from one another to provide a lattice structure having a varying cell density.

2. The light-weight high-strength scroll compressor component of claim 1, wherein the component has a tensile strength of greater than or equal to about 32,000 psi (about 220 MPa).

3. The light-weight high-strength scroll compressor component of claim 1, wherein the first region has a first deflection level and the second region having a second deflection level distinct from the first deflection level.

4. The light-weight high-strength scroll compressor component of claim 1, wherein the light-weight, high-strength compressor component is selected from the group consisting of: a bearing housing, a main bearing housing, a lower bearing housing, an orbiting scroll component, a non-orbiting scroll component, a crankshaft, a housing or a shell, a cap, a cover, a separator plate, a muffler plate, an Oldham coupling, a scroll compressor valve, a drive bushing, an interface region between a shell and stator and combinations thereof.

5. A method of making a light-weight, high-strength compressor component for a scroll compressor for a heating or cooling system that circulates a working fluid comprising a refrigerant, the method comprising:
applying energy in a predetermined pattern to a metal powder precursor to create a fused solid structure via an additive manufacturing process, wherein the fused solid structure defines a compressor component having a metallic lattice structure comprising a plurality of cells and a surface layer comprising a metal disposed over and entirely enclosing the metallic lattice structure to define an interior sealed region, wherein the surface layer seals the component from the working fluid comprising the refrigerant, wherein the compressor component has a tensile strength of greater than or equal to about 32,000 psi (about 220 MPa), wherein the plurality of cells comprises a first cell having a first maximum average dimension and a second cell having a second maximum dimension, wherein the first maximum average dimension and the second maximum average dimension are distinct from one another to provide a lattice structure having a varying cell density, wherein the body portion comprises: (i) a first region having a first deflection level and a second region having a second deflection level distinct from the first deflection level and/or (ii) a first region having a first stiffness and a second region having a second stiffness distinct from the first stiffness.

6. The method of claim 5, wherein the additive manufacturing process is selected from the group consisting of: direct-metal additive manufacturing, direct metal laser sintering (DMLS), selective laser sintering (SLS), selective laser melting (SLM), electron beam melting (EBM), stereolithography (SLA), laminated object manufacturing (LOM), fused deposition modeling (FDM), solid ground curing (SGC), and combinations thereof and the powder precursor comprises a material selected from the group consisting of: iron or an iron alloy, aluminum or an aluminum, titanium or a titanium alloy, a metal matrix composite, and combinations thereof.

7. A compressor for a heating or cooling system, the compressor comprising:
a compression mechanism configured to increase pressure of a working fluid comprising a refrigerant circulating in the heating or cooling system; and
at least one light-weight, high-strength compressor component comprising a body portion having at least one sealed interior region that comprises a metallic lattice structure comprising a plurality of cells formed via additive manufacturing and a surface layer comprising a metal disposed over and entirely enclosing the metallic lattice structure to seal the component from the working fluid comprising the refrigerant, wherein the compressor component has a tensile strength of greater than or equal to about 32,000 psi (about 220 MPa) configured to withstand distortion and deflection due to operating pressures of the working fluid processed in the compression mechanism, wherein the body portion comprises a first region having a first deflection level and a second region having a second deflection level distinct from the first deflection level and wherein the plurality of cells comprises a first cell having a first maximum average dimension and a second cell having a second maximum dimension, wherein the first maximum average dimension and the second maximum average dimension are distinct from one another to provide a lattice structure having a varying cell density.

8. The compressor of claim 7, wherein the body portion comprises a first region having a first stiffness and a second region having a second stiffness distinct from the first stiffness.

9. The compressor of claim 7, wherein each cell of the plurality comprises a node having a shape selected from the group consisting of: a sphere, a modified sphere comprising one or more flat surface regions, a sphere comprising posts, a cone, a double-cone, a pyramid, a diamond, a star, a cube, a polyhedron, an irregular asymmetrical globular shape, and combinations thereof.

10. The compressor of claim 7, wherein each cell of the plurality comprises a node selected from the group consisting of: a solid sphere, a porous sphere, a hollow sphere, a hollow sphere comprising a core filled with a plurality of loose particles, and combinations thereof.

11. The compressor of claim 7, wherein the plurality of cells comprises a first cell comprising a first node and a second adjacent cell comprising a second node, wherein the first node is connected to the second node by at least one connecting structure.

12. The compressor of claim 7, wherein the plurality of cells comprises a first cell comprising a first node and a second adjacent cell comprising a second node, wherein the first node has a distinct shape from the second node.

13. The compressor of claim 7, wherein each cell of the plurality of cells has a maximum average dimension of greater than or equal to about 0.1 mm to less than or equal to about 10 mm.

14. The compressor of claim 7, wherein each cell of the plurality comprises a solid structure defining one or more void regions therebetween, wherein the one or more void regions comprises loose residual metal particles or an insulating material disposed therein.

15. The compressor of claim 7, wherein each cell of the plurality comprises a solid structure defining one or more void regions therebetween, wherein the solid structure of a first cell of the plurality has a different thickness from a thickness of the solid structure in a second cell of the plurality.

16. The compressor of claim 7, wherein the light-weight, high-strength insulating compressor component is selected from the group consisting of: a bearing housing, a main bearing housing, a lower bearing housing, an orbiting scroll component, a non-orbiting scroll component, a housing or a shell, a cap, a cover, a separator plate, a muffler plate, an Oldham coupling, a scroll compressor valve, a drive bushing, an interface region between a shell and stator, a roller element, a roller element housing, a screw component, a screw, a gate rotor, a centrifugal compressor component, a bearing, a reciprocating component, a piston, a connecting rod, a crankshaft, a cylinder head, a compressor body, a discus valve, a discus valve retainer, a valve plate, and combinations thereof.

17. The compressor of claim 7, wherein the surface layer comprises a sealed removal hole.

18. The compressor of claim 7, wherein the lattice structure is oriented so that during deflection, the lattice structure is stressed in compression.

19. The compressor of claim 7, wherein the compressor is a semi-hermetic or hermetic compressor.

* * * * *